(12) United States Patent
Juillet et al.

(10) Patent No.: US 12,215,726 B2
(45) Date of Patent: Feb. 4, 2025

(54) RANGE TAKING SHEAR BOLTS AND DRIVE TOOLS

(71) Applicant: Richards Mfg. Co., A New Jersey Limited Partnership, Irvington, NJ (US)

(72) Inventors: Christopher A. Juillet, Warren, NJ (US); Bruce Bier, Warren, NJ (US); Jeffrey Madden, Bernardsville, NJ (US)

(73) Assignee: Richards Mfg. Co., A New Jersey Limited Partnership, Irvington, NJ (US)

( * ) Notice: Subject to any disclaimer, the term of this patent is extended or adjusted under 35 U.S.C. 154(b) by 349 days.

(21) Appl. No.: 17/657,680

(22) Filed: Apr. 1, 2022

(65) Prior Publication Data

US 2022/0316516 A1 Oct. 6, 2022

Related U.S. Application Data

(60) Provisional application No. 63/265,852, filed on Dec. 22, 2021, provisional application No. 63/170,763, filed on Apr. 5, 2021.

(51) Int. Cl.
*F16B 31/02* (2006.01)
*B25B 15/00* (2006.01)
*B25B 23/00* (2006.01)

(52) U.S. Cl.
CPC .......... *F16B 31/021* (2013.01); *B25B 15/008* (2013.01); *B25B 23/0035* (2013.01)

(58) Field of Classification Search
CPC .... F16B 31/021; F16B 35/005; F16B 35/007; F16B 23/0007; F16B 23/0038; H01R 4/36; H01R 4/363; H01R 4/366; B25B 15/008; B25B 23/0035; B25B 23/0007
See application file for complete search history.

(56) References Cited

U.S. PATENT DOCUMENTS

| | | | | |
|---|---|---|---|---|
| 3,190,169 A * | 6/1965 | Rosan | ............... | F16B 23/0007 411/403 |
| 3,865,007 A * | 2/1975 | Stanback | ............... | F16B 31/02 439/814 |
| 4,197,889 A * | 4/1980 | Peterson | ............ | F16B 23/0007 81/442 |
| 5,549,431 A * | 8/1996 | Royle | .................. | B25B 13/54 411/404 |
| 5,743,690 A * | 4/1998 | Royle | .................. | B25B 13/54 411/387.3 |
| 6,209,424 B1 * | 4/2001 | Croton | ................ | F16B 31/021 81/437 |
| 6,321,624 B1 * | 11/2001 | Croton | ................ | H01R 4/307 81/437 |

(Continued)

FOREIGN PATENT DOCUMENTS

DE 10234475 A1 * 1/2004 ............. B21K 1/463

OTHER PUBLICATIONS

Examination Report in related Canadian Patent Application No. 3,154,563, dated Mar. 27, 2024 (8 pages).

*Primary Examiner* — David B. Thomas
(74) *Attorney, Agent, or Firm* — Nixon Peabody LLP

(57) ABSTRACT

Range taking shear bolts and bolt installation (drive) tools are described herein, which are configured for use with a variety of range taking connectors and conductors.

23 Claims, 25 Drawing Sheets

(56) References Cited

U.S. PATENT DOCUMENTS

| | | |
|---|---|---|
| 6,884,124 B1 | 4/2005 | Luzzi |
| 8,317,443 B2 | 11/2012 | Stauch |
| 8,668,419 B2 | 3/2014 | Hardt |
| 8,987,595 B2 | 3/2015 | Bumgamer |
| 9,929,477 B2* | 3/2018 | Beiler .................. F16B 31/021 |
| 9,956,071 B2* | 5/2018 | Spenciner .......... A61B 17/8645 |
| 10,006,480 B2 | 6/2018 | Bier |
| 10,680,351 B2* | 6/2020 | Parsons ................... H01R 4/46 |
| 10,756,452 B2 | 8/2020 | Saeed |
| 11,092,185 B2* | 8/2021 | Peltier .................. F16B 31/021 |
| 11,326,639 B1 | 5/2022 | Juillet |
| 2012/0222718 A1* | 9/2012 | Sweeney ................ H02S 40/36 439/733.1 |
| 2017/0149378 A1* | 5/2017 | Castonguay ............. H01R 4/36 |
| 2018/0009089 A1* | 1/2018 | Degenkolb ............ F16B 35/06 |
| 2018/0306231 A1 | 10/2018 | Bier |
| 2018/0354102 A1 | 12/2018 | Kukucka |
| 2019/0245280 A1* | 8/2019 | Parsons ................... H01R 4/42 |
| 2019/0323538 A1 | 10/2019 | Link |
| 2020/0040930 A1* | 2/2020 | Peltier ...................... H01R 4/36 |
| 2022/0099131 A1* | 3/2022 | Barezzani ............ F16B 35/005 |

* cited by examiner

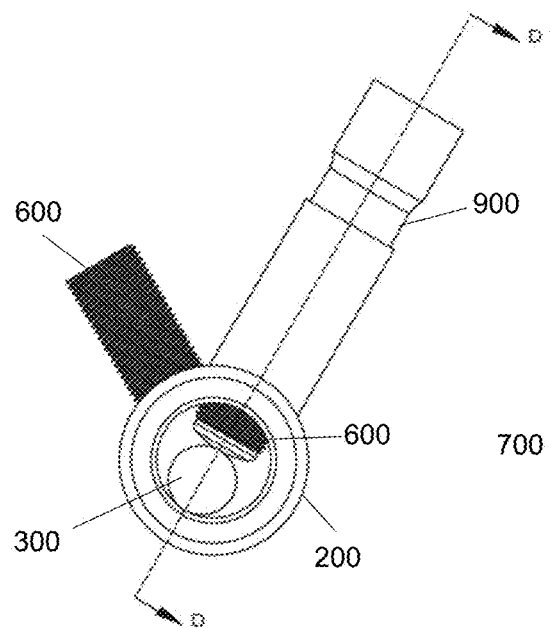
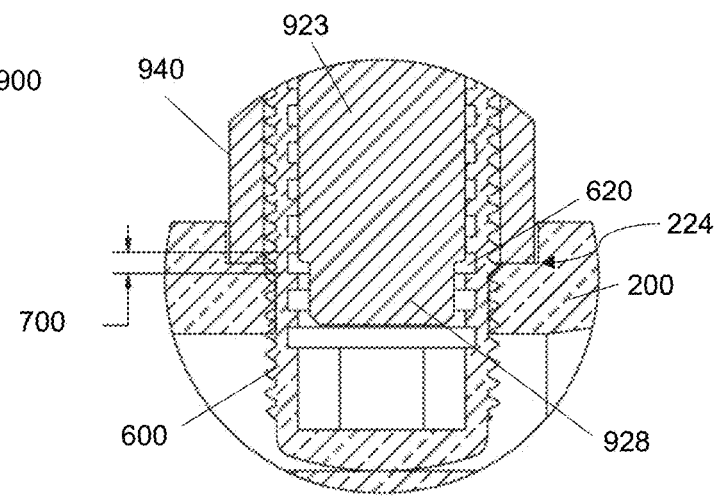
FIG. 22
FIG. 24
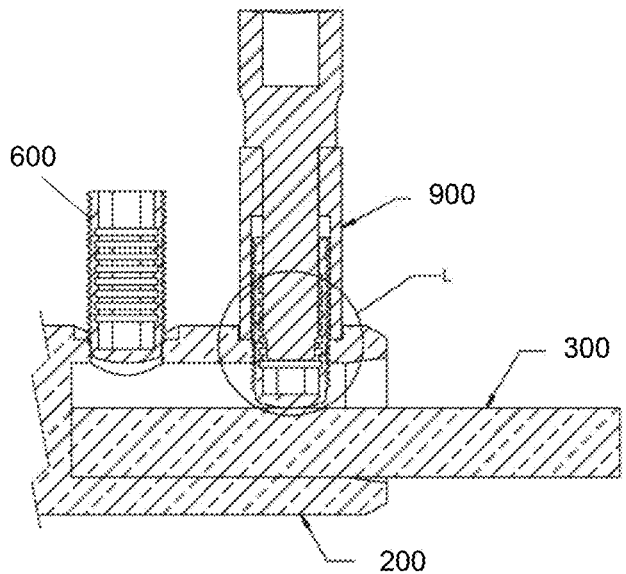
FIG. 23

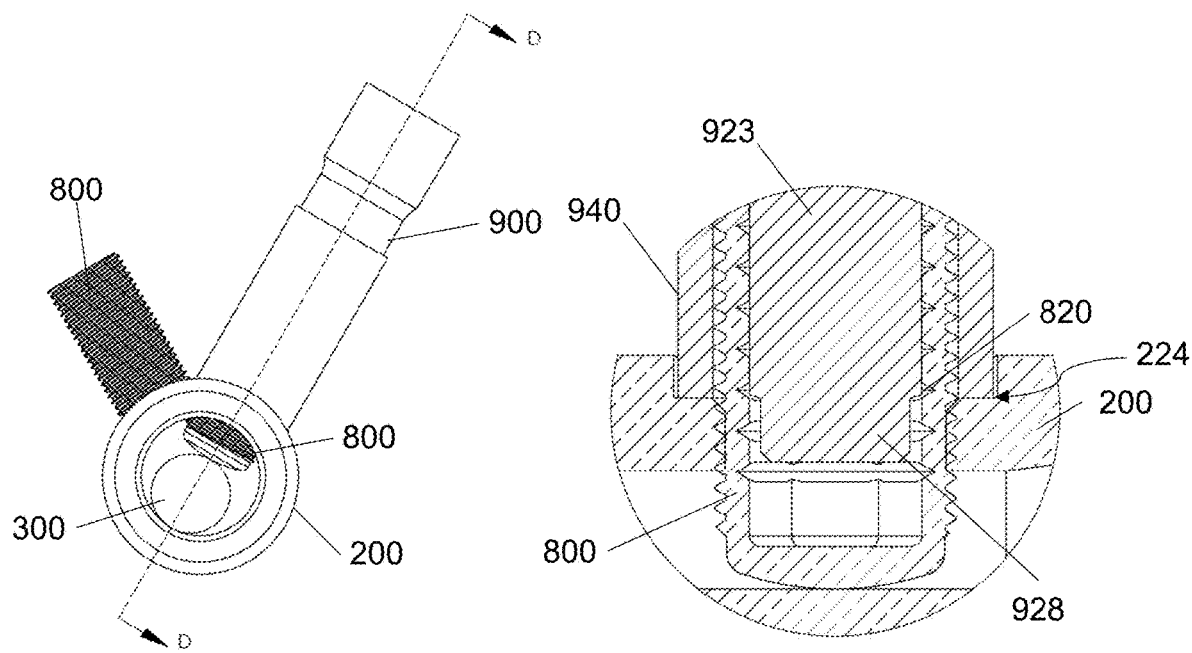
FIG. 48
FIG. 50
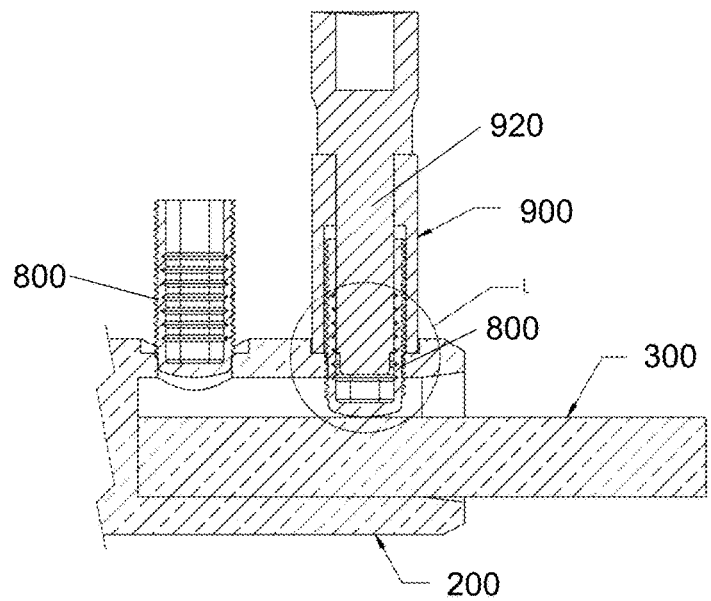
FIG. 49

RANGE TAKING SHEAR BOLTS AND DRIVE TOOLS

CROSS-REFERENCE TO RELATED APPLICATIONS

This application claims priority to and the benefit of U.S. Provisional Patent Application No. 63/170,763, filed on Apr. 5, 2021 and U.S. Provisional Patent Application No. 63/265,852, filed on Dec. 22, 2021, each of which is hereby incorporated by reference herein in its entirety.

BACKGROUND

Electric power cables of all sizes are joined using connectors made from electrically-conductive material, usually metal. The predominant metals used are copper and aluminum. There are different types of connectors—some designed to be crimped, and some using bolts/screws to secure the conductors (cables/wires).

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In some embodiments, the invention provides a range taking shear bolt having external screw threads and an internal bore, where the bore is other than round shape. The shear bolt includes one or more internal grooves spaced along the inner diameter substantially perpendicular to the center axis of the bolt. In some embodiments, the shear bolt includes one or more longitudinal grooves in the external screw thread along the length of the bolt. In some embodiments, instead of or in addition to the longitudinal groove(s), outer diameter grooves may be provided in the external screw thread, opposite the internal grooves.

A shear screw/bolt according to embodiments of the present invention is configured to clamp a cable in the bore of a connector and, at or about a specific force, have the part of the screw that is exterior to the connector break away and leave the top surface of the clamping portion at or below the outside surface of the connector. The internal grooves perpendicular to the center axis of the screw create a "shear plane" so that the surface after break (shear) is substantially in one plane at, or below the connector O.D. that is perpendicular to the center axis of the screw. The longitudinal grooves that are substantially parallel to the center axis of the screw effectively cut the thread thereby narrowing the window (tolerance) of the break point location.

According to certain aspects of the present disclosure, a range taking shear bolt includes a hollow body, a distal end, and a proximal end. The hollow body is defined by a wall having an outer surface and an inner surface. The inner surface has a non-round shape configured to engage with a drive tool, and includes a V-shaped internal groove substantially perpendicular to a longitudinal axis of the range taking shear bolt. The internal groove defines a shear point, where the wall is configured to shear when an applied torque reaches or exceeds a predetermined torque value. The outer surface has a continuous screw thread configured to engage with a threaded opening on a range taking connector. The distal end is configured to abut a cable conductor inside the range taking connector. The proximal end is configured to accept the drive tool.

In some examples, the range taking shear bolt is used in combination with the drive tool for installing the range taking shear bolt in the range taking connector. The drive tool includes an inner portion and an outer portion. The inner portion has a head portion and a drive portion. The drive portion has a non-round shape, and is configured to be accepted by the proximal end of the range taking shear bolt and engage with the inner surface of the hollow body. The outer portion includes a tubular body. The tubular body is configured to fit over the hollow body of the range taking shear bolt and abut the range taking connector to control a depth of insertion of the drive tool. In some examples, the head portion of the drive tool includes a hexagonal drive or a square drive configured to accept a socket or impact wrench. In some examples, the drive portion of the drive tool has a hexagonal shape.

In some examples, the predetermined torque value is dictated by a thickness of the wall. In some examples, the range taking shear bolt is formed from a metal or alloy. In some such examples, the range taking shear bolt is formed from bronze. In some examples, the inner surface of the range taking shear bolt has a hexagonal shape. In some such examples, the inner surface having the hexagonal shape extends into the proximal end.

According to certain aspects of the present disclosure, a range taking shear bolt includes a distal end, a proximal end, and a hollow body. The distal end is configured to abut a cable conductor inside a range taking connector. The proximal end is configured to accept a drive tool. The hollow body is defined by a wall having an outer surface and an inner surface. The inner surface has a non-round shape, and is configured to engage with the drive tool. The inner surface also includes an internal groove defining a shear point, where the wall is configured to shear when an applied torque from the drive tool reaches or exceeds a predetermined torque value. The outer surface has a continuous screw thread, and is configured to engage with a threaded opening on the range taking connector. The outer surface extends between the distal end and the proximal end. The continuous screw thread is uninterrupted between the distal end and the proximal end.

In some examples, the non-round shape is polygonal. In some such examples, the non-round shape is hexagonal. In some examples, the internal groove is V-shaped, such that a tip of the V-shape defines a smallest thickness of the wall of the hollow body. In some examples, the inner surface of the hollow body includes a plurality of internal grooves. In some such examples, the plurality of internal grooves is evenly spaced.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 22 shows the end view of FIG. 20 with one of the bolts tightened against the conductor;

FIG. 23 is a sectional view, taken along line D-D of FIG. 22;

FIG. 24 shows detail L of FIG. 23;

FIG. 48 shows the end view of FIG. 46 with one of the range taking shear bolts tightened against the conductor;

FIG. 49 is a sectional view, taken along line D-D of FIG. 48;

FIG. 50 shows detail L of FIG. 49;

DETAILED DESCRIPTION

Figure 1:
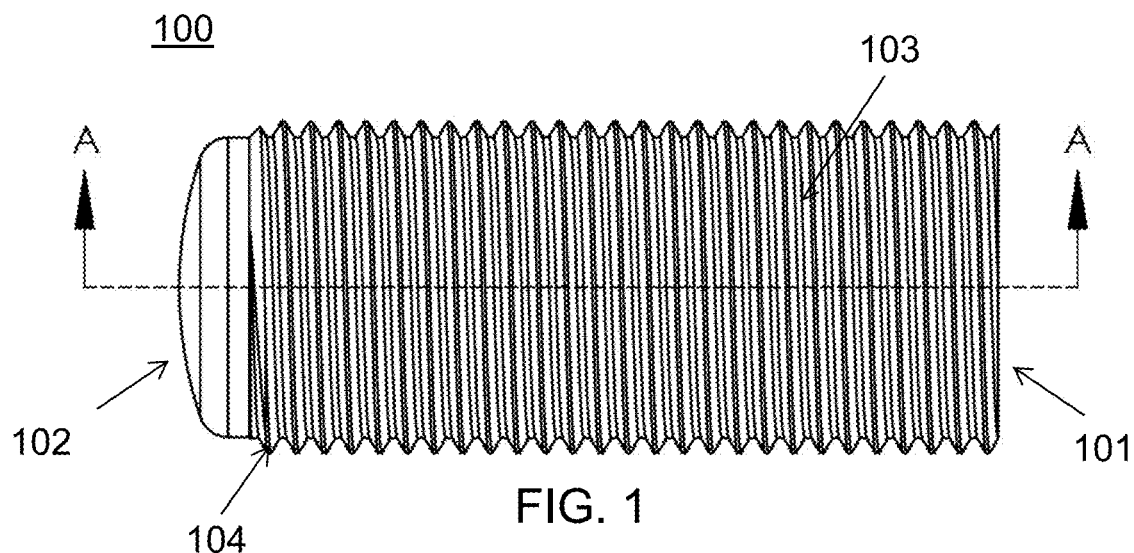
FIG. 1 is a side view of a range taking shear bolt according to some embodiments of the disclosure.

Various embodiments of the present disclosure provide range taking shear bolts and bolt installation (drive) tools, which are configured for use with a variety of range taking connectors and conductor cables (or other articles being connected).

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Many electrical cables are connected using screws and/or bolts. Typically, the screws/bolts create and maintain pressure on the two conductors being connected to minimize electrical contact resistance.

In the case of bolted connections between a connector and an electrical cable, it is desirable to control the torque applied to the bolt, so that there is sufficient torque applied to create a secure connection (both electrically and mechanically), but not so much as to damage the conductor. In order to assure that the correct amount of torque has been applied to the screw/bolt and to accomplish torque control without using a torque wrench, a shear feature may be employed such that part of the fastener breaks (shears) after a minimum amount of torque is reached, but before too much torque can be applied. Specifically, at least one shear point or shear zone can be created, at or about where the driven portion of the bolt shears off (separates) from the clamping portion of the bolt at or approximate a predetermined torque value. The driven portion can then be discarded.

In certain applications, shear screws/bolts are used to secure cables in cable connectors. Said connectors are hollow tubular shapes that can accept either a single size cable, or a range of size cables. In certain applications, it is desirable to provide connectors that are "range taking"—meaning that a range of conductor sizes can be accommodated using the same connector. In the case of range taking connectors, it is necessary for the screw/bolt to penetrate the wall of the tubular connector to different depths depending on the diameter of the cable being secured. For example, the smaller the diameter of the cable, the deeper the penetration of the shear screw/bolt.

Shear screw/bolt connectors may be used in a variety of cable connector applications. When used in "medium voltage" (5 kv to 35 kv) or high voltage (above 35 kv) cable connections, it may be necessary to avoid having any part of the screw/bolt protrude beyond the circumference of the connector post shearing.

Various embodiments of the present disclosure combine the features identified above, providing shear (torque limiting) screws/bolts for range taking electrical cable connectors, the shear screws/bolts configured shear/break at or just below the outside circumference of the connector. Accordingly, various embodiments of the disclosure can provide a range taking connector with the reliability of shear bolts.

In some embodiments, the disclosure provides a range taking shear bolt having external screw threads and an internal bore, where the bore is other than round shape. The shear bolt includes one or more internal grooves spaced along the inner diameter substantially perpendicular to the center axis of the bolt. In some embodiments, the shear bolt includes one or more longitudinal grooves in the external screw thread along the length of the bolt. In some embodiments, instead of or in addition to the longitudinal groove(s), outer diameter grooves may be provided in the external screw thread, opposite the internal grooves.

A shear screw/bolt according to some embodiments of the present disclosure is configured to clamp a cable in the bore of a connector and, at or about a specific force, have the part of the screw that is exterior to the connector break away and leave the top surface of the clamping portion at or below the outside surface of the connector. The internal grooves perpendicular to the center axis of the screw create a "shear plane" so that the surface after break (shear) is substantially in one plane at, or below the connector O.D. that is perpendicular to the center axis of the screw. The longitudinal grooves that are substantially parallel to the center axis of the screw effectively cut the thread thereby narrowing the window (tolerance) of the break point location.

For example, some embodiments of the present disclosure provide range taking shear bolts that: break at a specific torque range; sufficiently clamp the conductors for both thermal cycling and mechanical pullout; break consistently (shear off) at or just below the outer surface of the connector; and/or are removable after shearing in the event that removal becomes necessary or desirable. Most products on the market have drawbacks related to one or more of these features.

Figure 2:
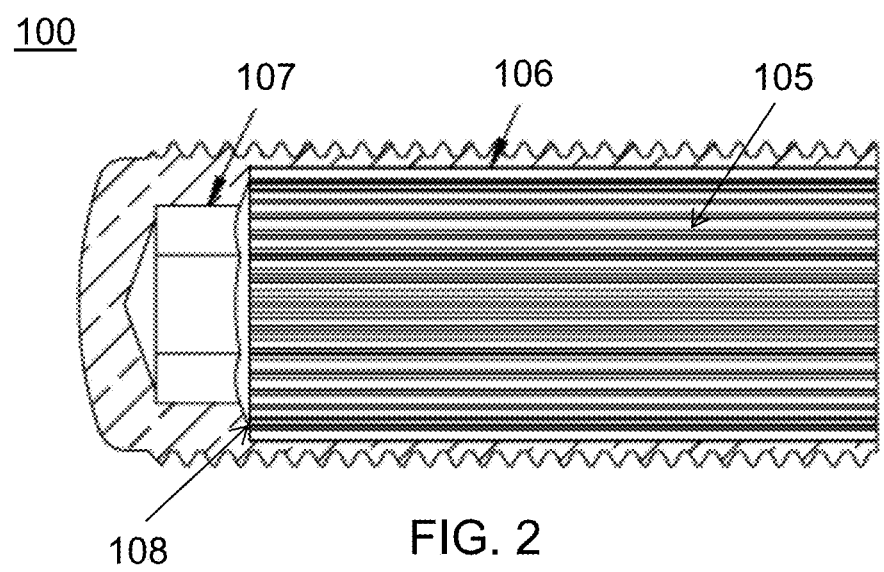
FIG. 2 is a sectional view, taken along line A-A of FIG. 1.
Figure 6:
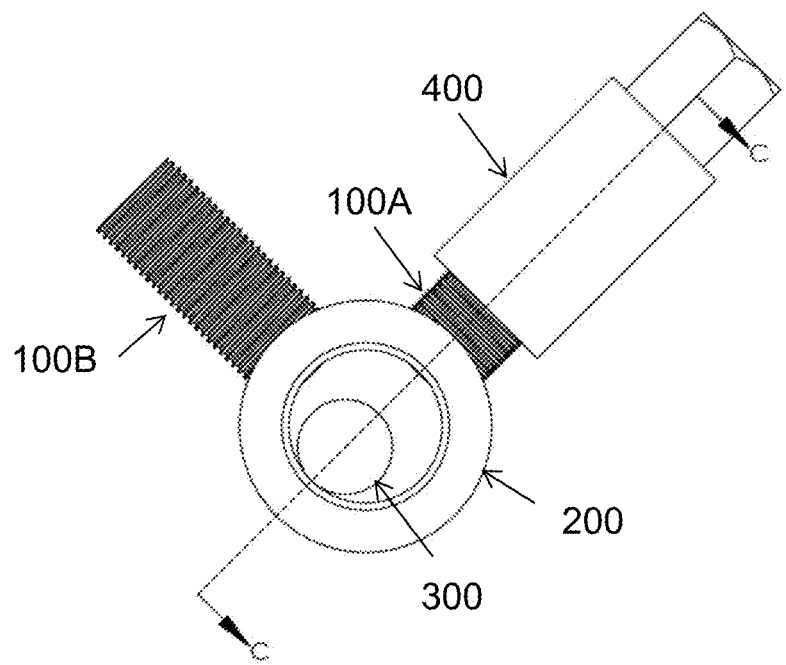
FIG. 6 shows the end view of FIG. 4 with a cable conductor and a bolt installation tool included.
Figure 9:
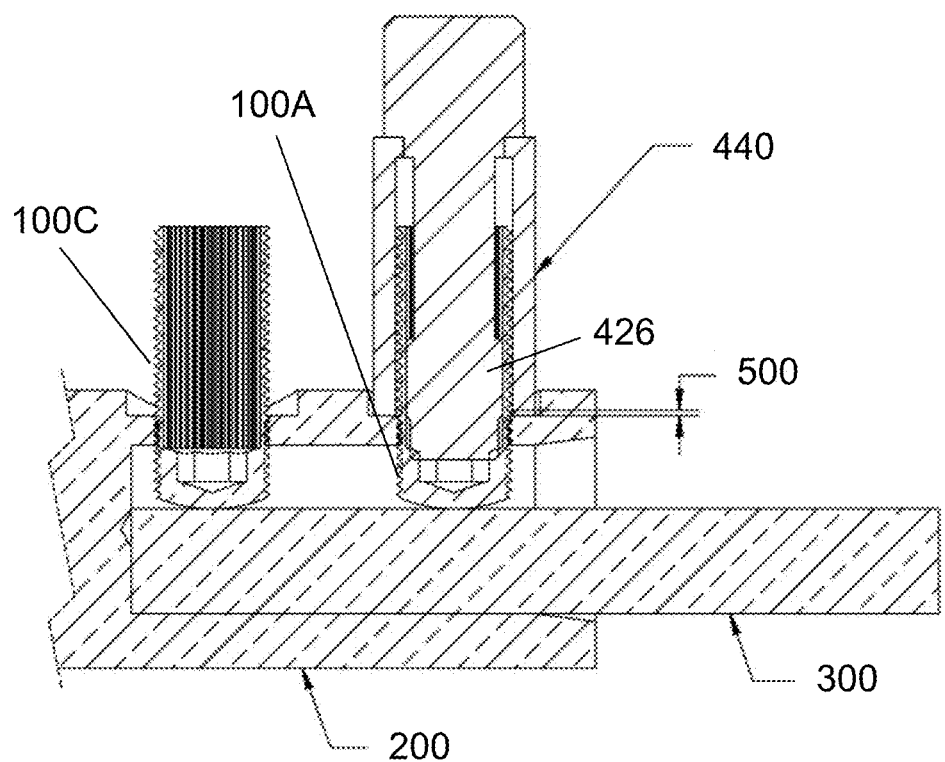
FIG. 9 is a sectional view, taken along line D-D of FIG. 8.

With reference to FIGS. 1 and 2, an illustrative range taking shear bolt 100 is shown. Range taking shear bolt 100 is substantially cylindrical, comprising a hollow cylindrical body having a proximal end 101, a distal end 102, an outer surface 103, and an inner surface 105. As described in further detail below, proximal end 101 is constructed and arranged to accept a bolt installation tool 400, also referred to herein as a drive tool (e.g., as shown in FIG. 6), and distal end 102 is constructed and arranged to abut a conductor 300 (e.g., as shown in FIG. 9). Proximal end 101 is preferably substantially or entirely open. Distal end 102 is preferably substantially or entirely closed. Outer surface 103 of range taking shear bolt 100 preferably has a screw thread 104 thereon. Screw thread 104 may comprise, for example, a substantially continuous external thread that allows range taking shear bolt 100 to be screwed into a connector 200. It should be understood that such thread 104 need not extend along the entire length of the bolt 100.

Figure 3A:
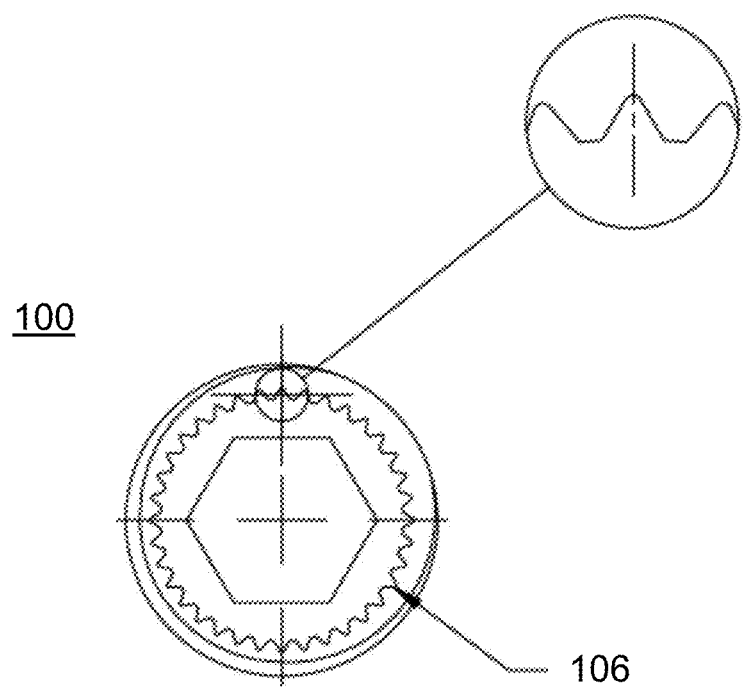
FIG. 3A is a top view of a range taking shear bolt of the present disclosure, showing spline teeth according to some embodiments.
Figure 3B:
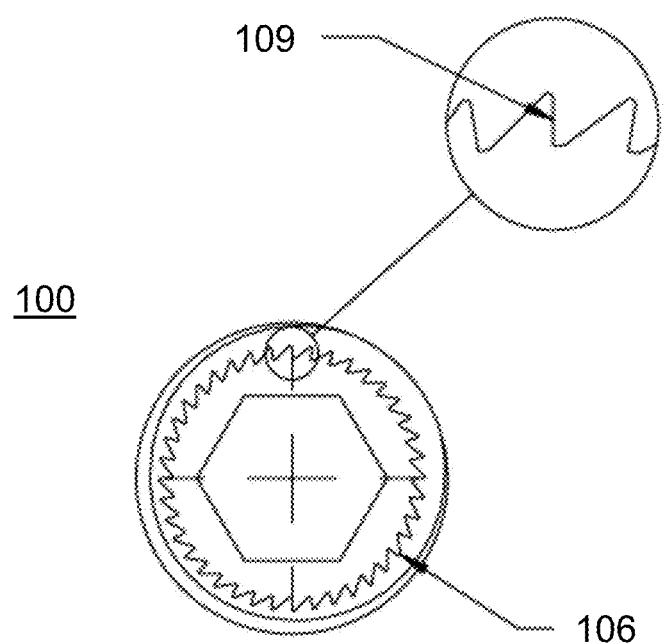
FIG. 3B is a top view of a range taking shear bolt of the present disclosure, showing spline teeth according to other embodiments.

Inner surface 105 of range taking shear bolt 100 has a plurality of spline teeth 106 (e.g., female spline teeth) thereon, which can function like gear teeth. Spline teeth 106 may comprise, for example, a plurality of raised ridges running longitudinally along the length of inner surface 105 (e.g., from a shoulder 108 near distal end 102 all the way to an open proximal end 101). In certain embodiments, spline teeth 106 may have a substantially triangular cross-section. In some embodiments, as shown, for example, in FIG. 3A, spline teeth 106 may be symmetrical. In other embodiments, as shown, for example, in FIG. 3B, spline teeth 106 may be asymmetrical, similar to a saw tooth, such that a line extending from the drive face 109 would go through (or in close proximity to) the center of the cylindrical body of bolt 100. In further embodiments, spline teeth 106 may have other shapes and/or arrangements that can complement and/or guide drive tool 400. For example, the spline teeth need not run the entire length of the inner surface 105.

The wall of cylindrical shear bolt 100 is configured to shear/break cleanly at or above a predetermined torque value (with an acceptable tolerance range). The predetermined torque value may be a function of the wall thickness between external thread 104 and internal teeth 106. The thickness may be determined, for example, based on the physical properties/metallurgy of bolt 100 (e.g., type of metal, hardness, elongation, etc.). Bolt 100 may be made from any material. In some embodiments, bolt 100 may be formed from a metal (e.g., copper, zinc, etc.) or alloy, such as, but not limited to, brass. In other embodiments, non-metal materials may be used.

In some embodiments, inner surface 105 may also include a hexagonal broach 107 proximate a closed distal end 102 (solid bottom portion) of bolt 100, bordering the distal end of longitudinal spline teeth 106 at shoulder 108. Hexagonal broach 107 comprises a hexagonal impression at the bottom of inner surface 105 of range taking shear bolt 100, which can facilitate removal of the clamping portion of bolt 100 once the driven portion (bolt head) has sheared off (see FIGS. 12-14). Around the hollow hexagonal impression 107, closed distal end 102 is solid. In alternative embodiments, other broaches or impressions may be used to facilitate removal.

Figure 4:
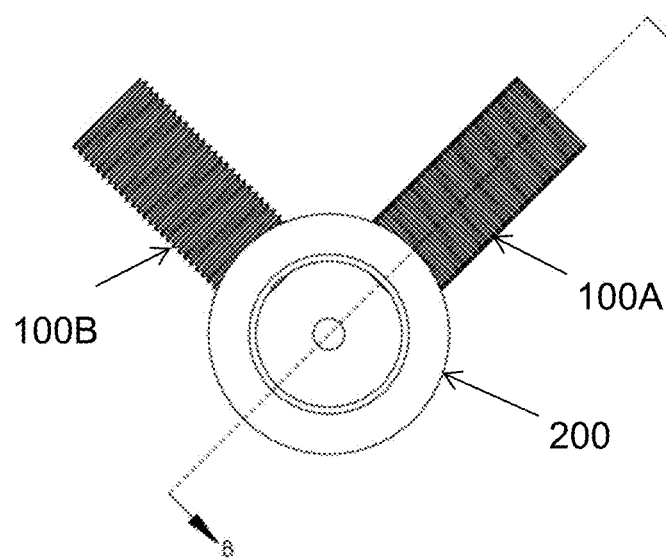
FIG. 4 is an end view of a connector with range taking shear bolts of the present disclosure partially installed therein.
Figure 5:
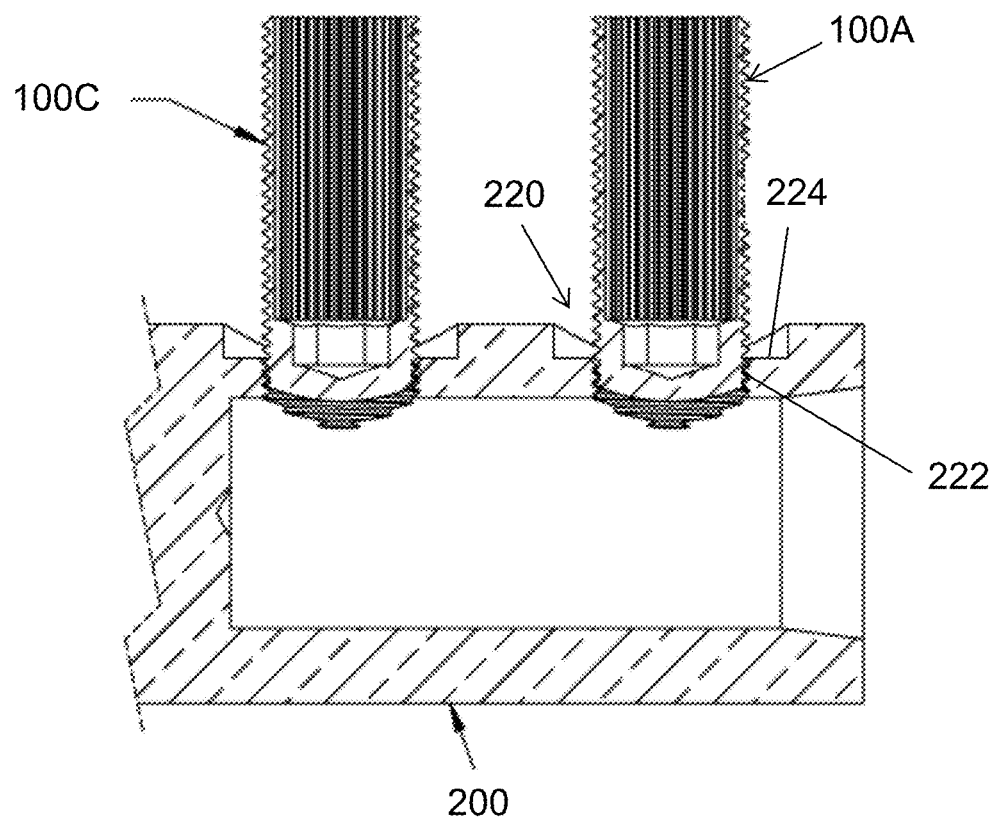
FIG. 5 is a sectional view, taken along line B-B of FIG. 4.

FIGS. 4 and 5 show range taking shear bolts 100 partially installed in/positioned to be screwed further into a range taking connector 200. The body of connector 200 may be substantially tubular, configured to accept cable, and may be made of any suitable material—for example, a machined metal, typically copper or aluminum. A plurality of bolt installation sites 220 may be provided along the length of connector 200, which may be staggered, for example, by 90 degrees. FIGS. 4 and 5 show three set screws/bolts 100 (as used herein, the terms screw and bolt are interchangeable), two (100A and 100C) aligned as shown in the sectional view of FIG. 5 (one of which, 100A, is shown in FIG. 4), and a third (100B) offset by 90 degrees as shown in FIG. 4. Each bolt installation site 220 is configured to accept a range taking shear bolt 100 substantially perpendicular to the axis of the cable, and may comprise a threaded opening 222. In some embodiments, the outer diameter of connector body 200 may comprise a recessed portion/depression 224 at each bolt installation site 220. In other embodiments, the outer diameter of connector body 200 may comprise a substantially even surface.

Figure 7:
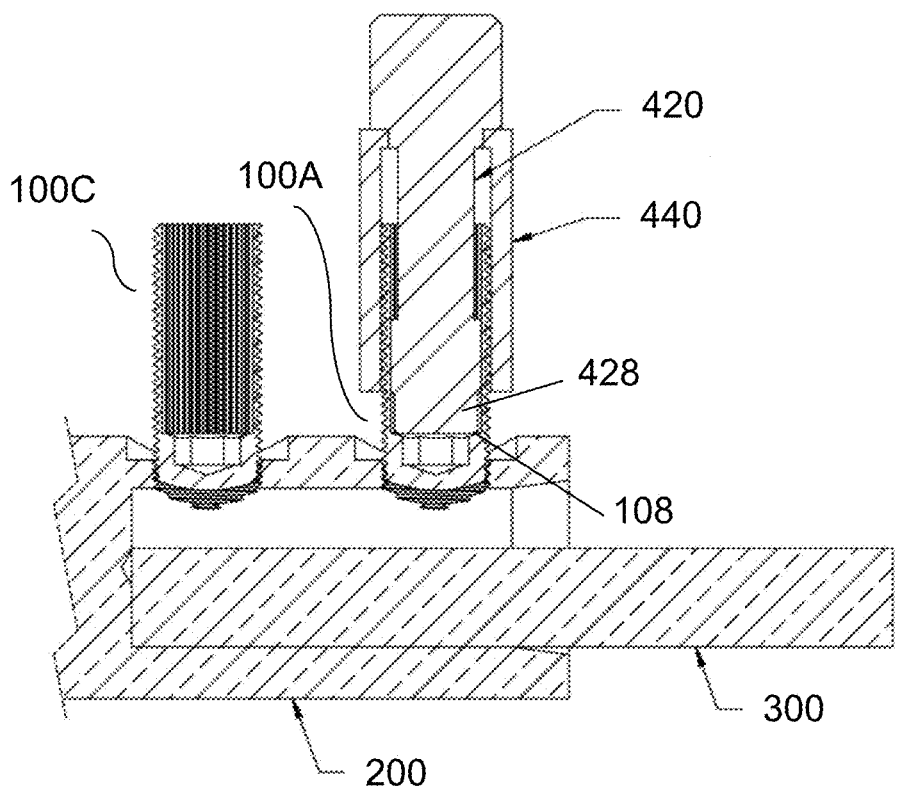
FIG. 7 is a sectional view, taken along line C-C of FIG. 6.

FIGS. 6 and 7 show range taking shear bolts 100A-C partially installed in connector 200 (as in FIGS. 4 and 5), with a cable conductor 300 and a bolt installation tool 400 also illustrated. As shown, for example, in FIG. 6, the body of connector 200 has an inner diameter larger than that of cable conductor 300, and thus can accommodate a range of conductor sizes. In certain embodiments, cable conductor 300 comprises a copper or aluminum cable.

As shown, for example, in FIG. 7, in some embodiments, drive tool 400 comprises an inner drive portion 420 and an outer spacer portion 440. Inner portion 420 is configured to be positioned inside the hollow cylindrical body of bolt 100 and/or inside spacer portion 440, and comprises an inner drive tool with spline teeth to screw bolt 100 into connector 200. Outer portion 440 is configured to be positioned outside the hollow cylindrical body of bolt 100 and comprises an outer spacer tube to control shear zone 500 on bolt 100, as described further below. Outer portion 440 has an inner diameter that is approximately equal to or larger than an outer diameter of bolt 100, so that outer portion 440 of tool 400 can fit over and slide along the outer surface 103 of bolt 100. Inner portion 420 preferably has a distal end portion 428 (see also FIG. 11A) constructed and arranged to abut shoulder 108 on inner surface 105 of bolt 100, so that inner portion 420 of drive tool 400 does not engage the hexagonal impression 107 in bolt 100.

Figure 8:
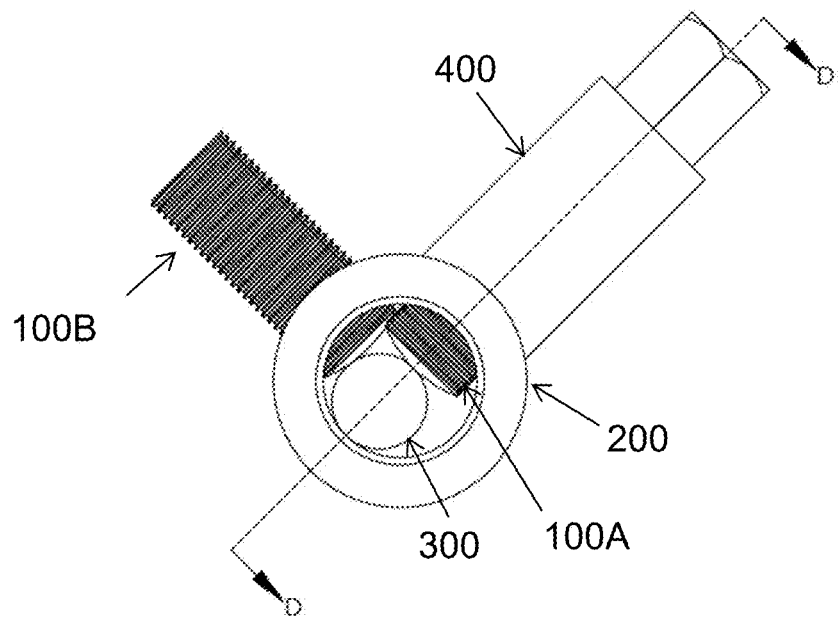
FIG. 8 shows the end view of FIG. 6 with the bolts tightened against the conductor.

FIGS. 8 and 9 show range taking shear bolts 100A-C (as in the views of FIGS. 6 and 7) installed in connector 200 and tightened against conductor 300. In some embodiments, outer tube 440 controls the depth of drive tool 400 to ensure that bolt 100 shears within a predetermined shear zone 500 at or about the outside surface of connector 200, or the bottom of depression 224 (socket) if present. Shear zone 500 occurs between the distal end of spline drive 426 (see also FIGS. 11A and 11B) and connector 200 shear surface—i.e., the outer diameter of connector body 200, or the bottom of depression 224 (socket) if present.

Figure 10:
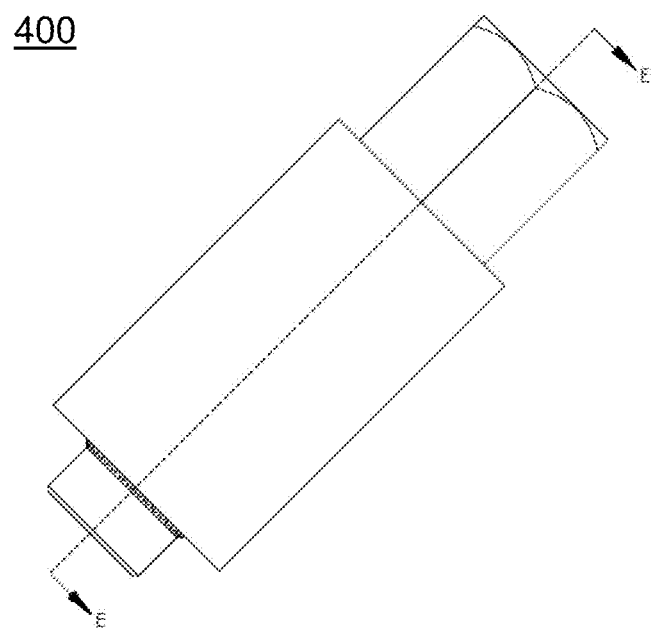
FIG. 10 is a side view of a bolt installation tool according to some embodiments of the disclosure.
Figure 11A:
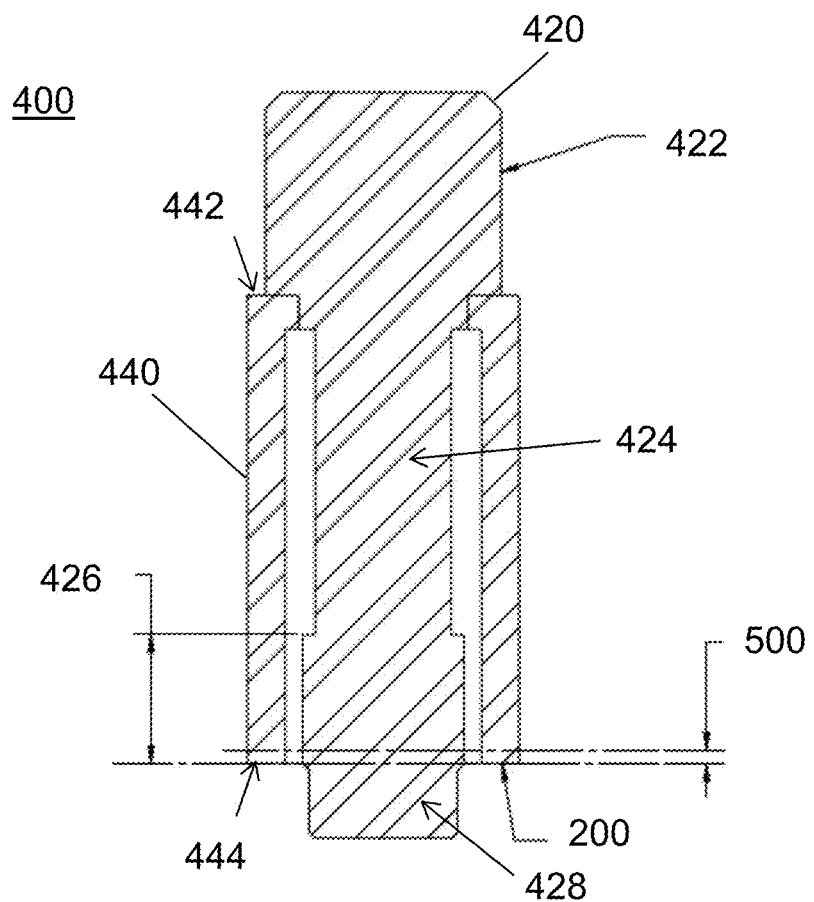
FIG. 11A is a sectional view, taken along line E-E of FIG. 10.
Figure 11B:
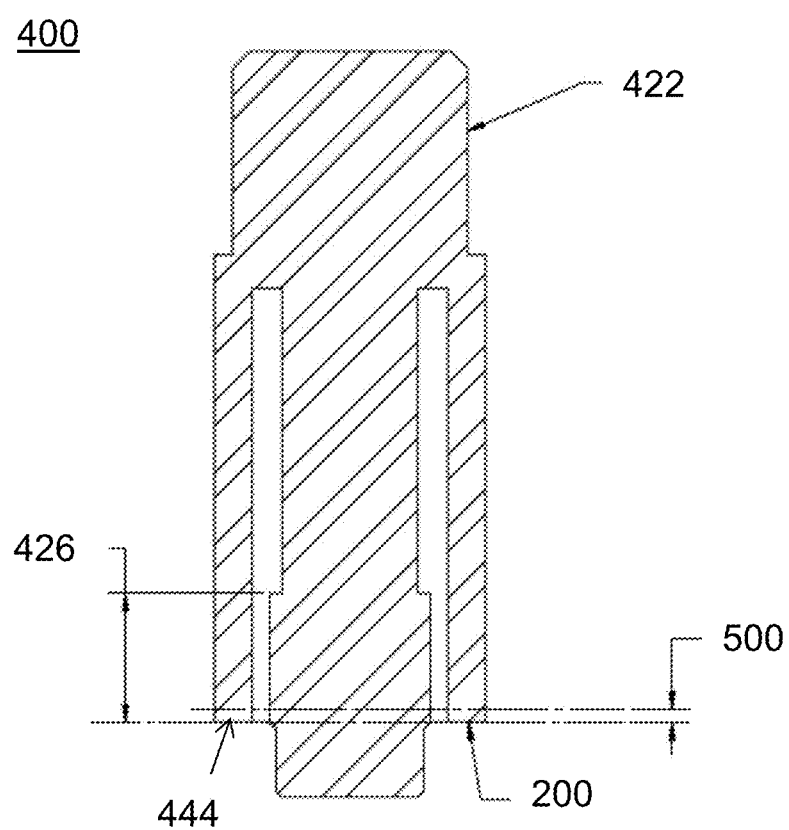
FIG. 11B is an alternative sectional view, taken along line E-E of FIG. 10.

FIGS. 10, 11A, and 11B show a bolt installation tool 400 in detail. In FIGS. 11A and 11B, a simulated outer diameter of connector body 200 is depicted. Range taking shear bolt 100 is configured to shear off at or near this surface—specifically, within bolt shear zone 500—regardless of its engagement depth into connector 200. In some embodiments, a head portion 422 of the drive tool 400, positioned at a proximal end of inner portion 420, can be hexagonal (a hex head), for example, to tighten drive tool 400 using a conventional socket wrench. A middle portion 424 of inner portion 420 can comprise an elongated stem, which has a diameter less than that of head 422, and less than the inner diameter of bolt 100. A spline drive portion 426 of inner portion 420 comprises longitudinal spline teeth (e.g., male spline teeth) complementary to spline teeth 106 on inner surface 105 of bolt 100. Spline teeth on spline drive portion 426 of drive tool 400 are constructed and arranged to engage with spline teeth 106 on inner surface 105 of bolt 100 to drive bolt 100 into connector 200 when drive tool 400 is rotated along its longitudinal axis. A distal end portion 428 of inner portion 420 of drive tool 400 can provide a short pilot diameter that has no spline teeth.

Thus, drive tool 400 can slide onto bolt 100 (as shown, e.g., in FIGS. 6-9) with inner drive tool portion 420 configured to slide along the inner surface 105 of bolt 100 and stop when distal end portion 428 abuts the shoulder 108 of bolt 100, and outer tube 440 configured to slide along the outer surface 103 of bolt 100 and stop when bottom edge 444 reaches the outer diameter of the connector body 200 (or the bottom of depression 224 at bolt site 220, if present). Drive tool 400 can be turned (e.g., via head 422), and screw thread 104 on outer surface 103 of bolt 100 can engage with threaded opening 222 on connector 200, to tighten bolt 100 against cable conductor 300 (as shown, e.g., in FIGS. 8, 9) until a predetermined torque value is reached and bolt 100 shears at shear zone 500 (as shown, e.g., in FIGS. 12-14).

In some embodiments, drive tool 400 may be provided in two pieces (420 and 440), as shown, for example, in FIGS. 7, 9, and 11A. Using a two piece drive tool, outer spacer tube 440 may, for example, be held in place against connector 200 while inner tool 420 is turned to screw bolt 100 into threaded opening 222, until the underside of head portion 422 abuts an upper shoulder 442 on tube 440 formed by a circumferential flange extending inward from the wall of tube 440. In other embodiments, drive tool 400 may comprise a single piece, as shown, for example, in FIG. 11B (inner and outer portions 420 and 440 either formed as one or fused together/fixed to one another by welding, adhesive, or other connective means), and the entire drive tool 400 may be turned to screw bolt 100 into connector 200 until a lower face 444 of the outer spacer tube portion abuts the outer diameter of connector body 200 (or the bottom of depression 224 at bolt site 220, if present).

Figure 12:
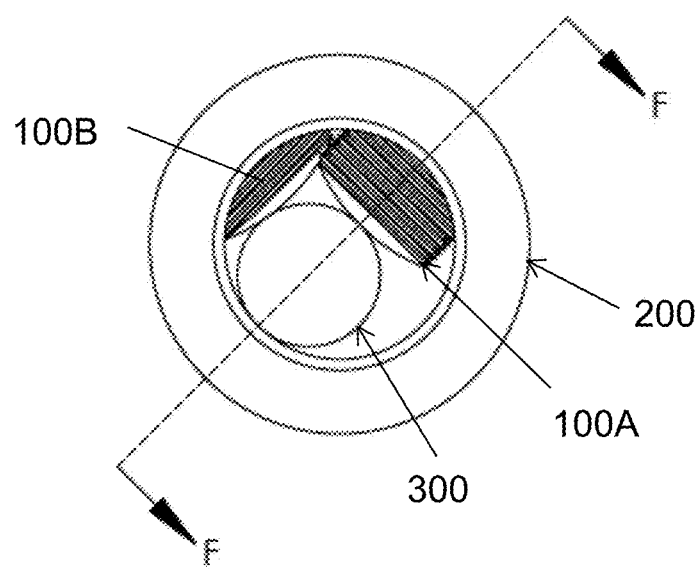
FIG. 12 shows the end view of FIG. 8 with the bolt heads sheared off and the bolt installation tool removed.
Figure 13:
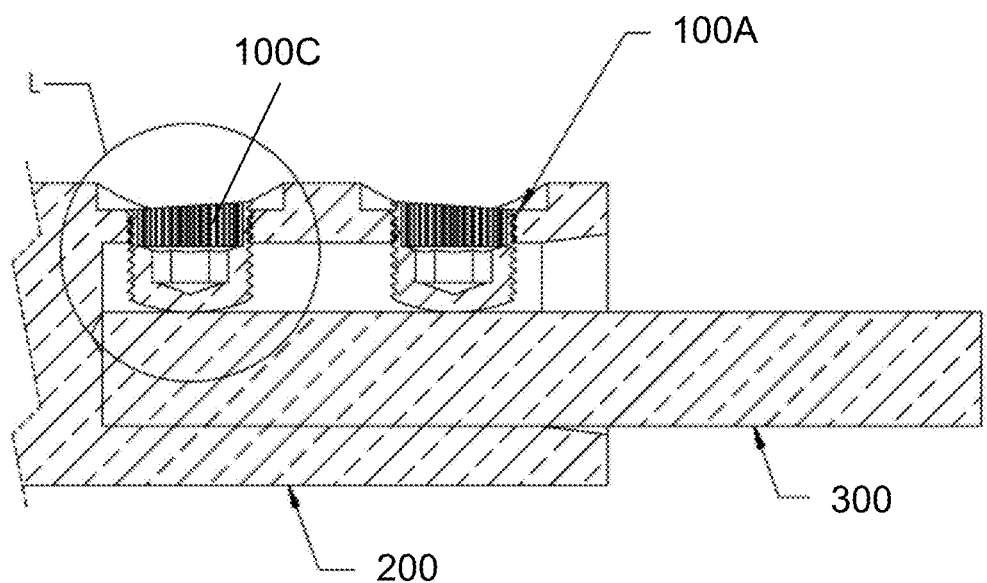
FIG. 13 is a sectional view, taken along line F-F of FIG. 12.
Figure 14:
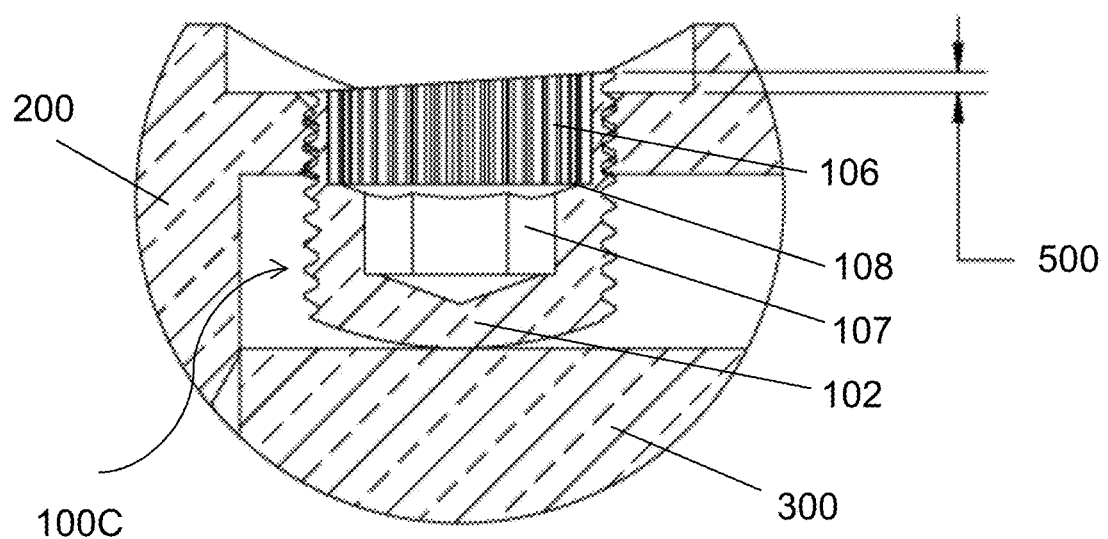
FIG. 14 shows detail L of FIG. 13.

FIGS. 12 and 13 show range taking shear bolts 100 (as in the views of FIGS. 8 and 9) fully installed in connector 200, with the bolt head (driven portion) sheared off. As shown, for example, in FIGS. 13 and 14, bolt 100 preferably shears at a point flush, within one revolution of thread 104, with the outer diameter of connector body 200 (or the bottom of depression 224 at bolt site 220, if present). Shear zone 500 is preferably approximately equal to one thread height of bolt 100, although in other embodiments different widths may be used. In the present embodiments, shear zone 500 will occur at the outer surface of connector 200, or the bottom of depression 224 if present, regardless of engagement depth.

Figure 15:
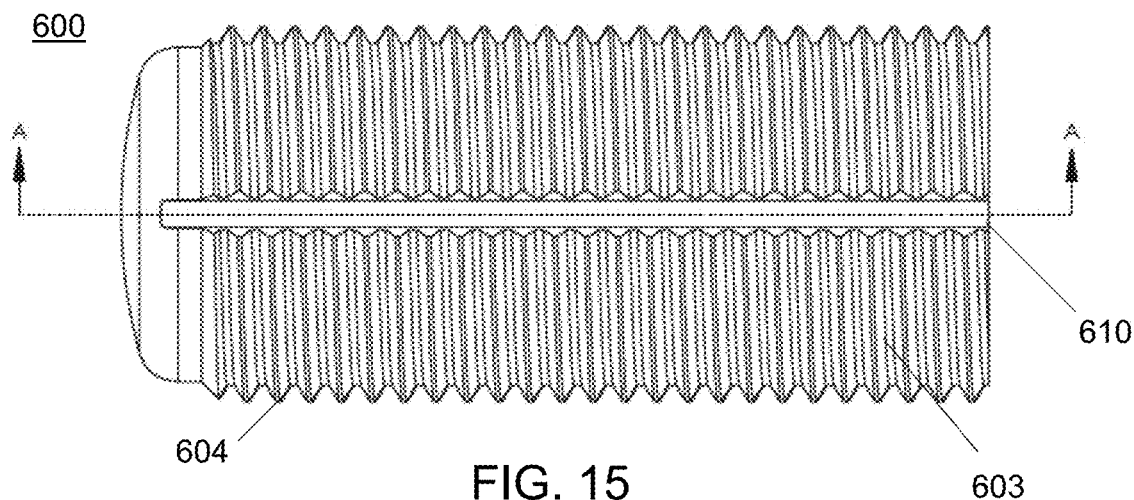
FIG. 15 is a side view of a range taking shear bolt according to some embodiments of the disclosure.
Figure 16:
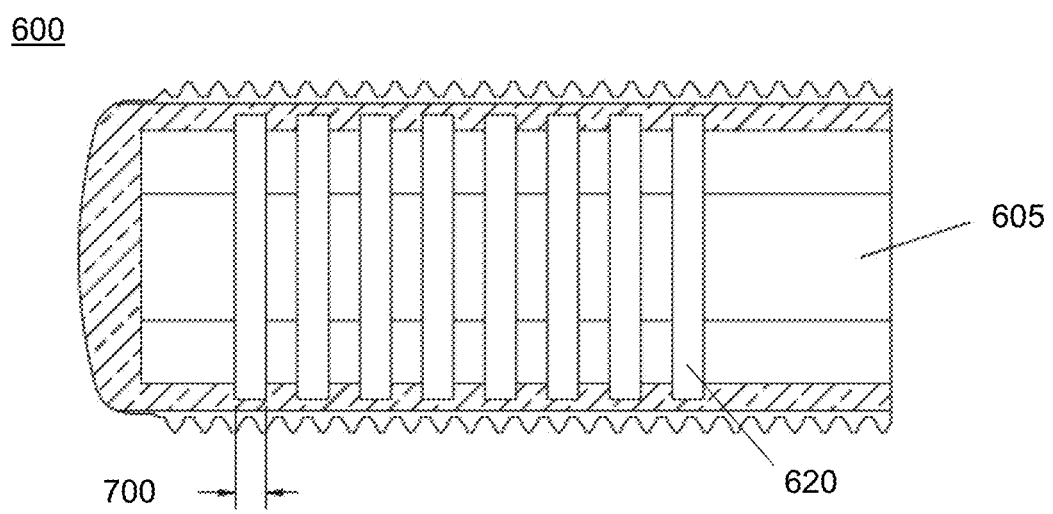
FIG. 16 is a sectional view, taken along line A-A of FIG. 15.
Figure 17:
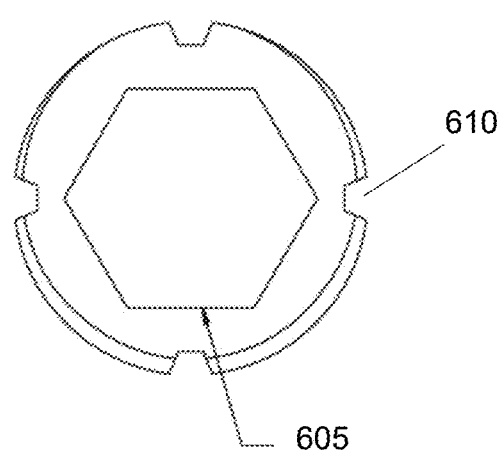
FIG. 17 is a top view of the range taking shear bolt of FIG. 15.

As shown, for example, in FIGS. 15-26, in some embodiments, a range taking shear bolt 600 may be provided similar to FIGS. 1-9, 12-14 but with an inner surface/bore 605 comprising a non-round shape such as, but not limited to, a hexagonal shape, as shown in the top/proximal end view of FIG. 17. As shown in FIG. 15, in some embodiments, along with external screw thread 604, one or more longitudinal grooves 610 may be provided on outer surface 603. Grooves 610 run substantially parallel to the center axis of the screw/bolt and create a discontinuity in the thread 604 along the groove 610. As shown in FIG. 16, which shows a cross section along A-A of FIG. 15, in some embodiments, one or more internal grooves 620 are provided, spaced along the inner diameter (I.D.) substantially perpendicular to the center axis of the screw/bolt 600. I.D. grooves 620 create multiple shear zones 700 along the length of the screw/bolt 600 by creating a uniform reduced wall thickness between the outside threaded surface and the I.D. These thinner wall sections provided by grooves 620 serve as the shear zones 700 where the bolt 600 will break when the appropriate tightening torque is achieved. The groove 620 shape shown is square, but could be any shape that achieves a reduced wall thickness. The number and exact position of interior grooves 620 may vary according to the specific application, and the spacing between the grooves 620 may be uniform or variable. An embodiment bolt 600 having internal grooves 620 and longitudinal grooves 610 can ensure a clean break with no burr or loose sections of material breaking off during shearing. The internal grooves 620 are the main shear zones 700; the longitudinal grooves 610 divide up each of those shear zones into different sections (here four) to allow the thread to break in the closest location. The additional segmentation of the shear zone 700 provided by the longitudinal grooves 610 can eliminate the chances of a burr forming when the bolt 600 shears.

The material used to form the bolt 600 may comprise a metal (such as, but not limited to, copper and zinc) or alloy (such as, but not limited to, brass or bronze). In some embodiments, the bolt 600 may be made from 314 commercial bronze. This type of bronze (alloy 314) has a high electrical conductivity as well as mechanical properties suitable for this application. Bronze can be a particularly suitable material for this application due to its strength and low elongation, and that it is electrically conductive, and has natural corrosion protection. It can be readily tin plated for use on copper or aluminum cable for further corrosion protection.

Figure 18:
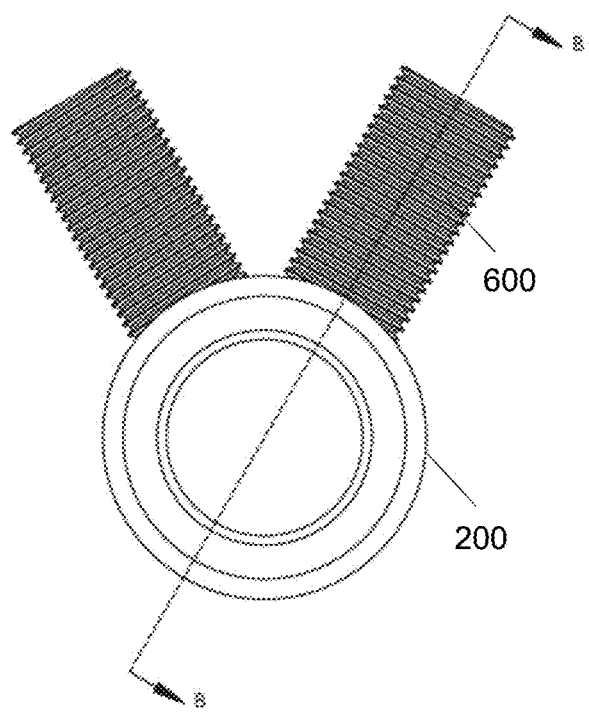
FIG. 18 is an end view of a connector with range taking shear bolts of the present disclosure partially installed therein.
Figure 19:
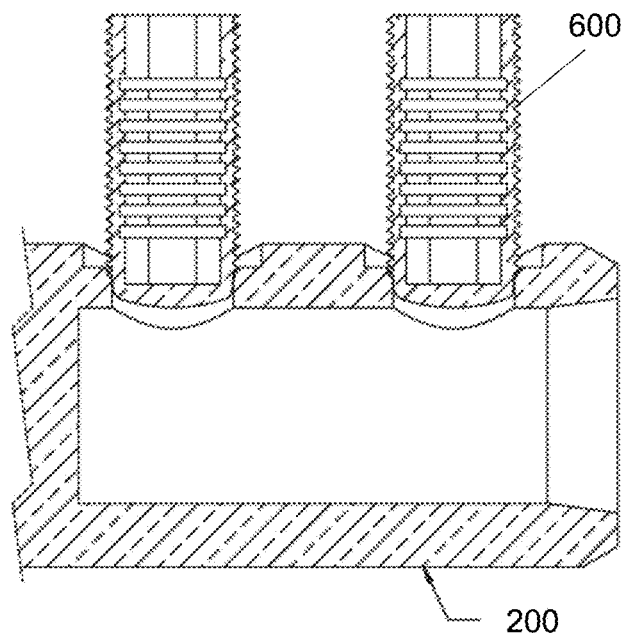
FIG. 19 is a sectional view, taken along line B-B of FIG. 18.
Figure 20:
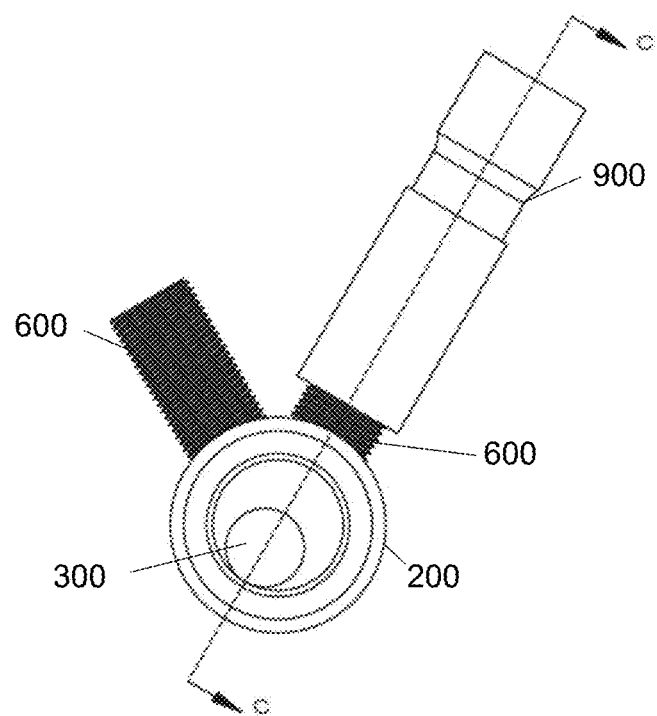
FIG. 20 shows the end view of FIG. 18 with a cable conductor and a bolt installation tool included.
Figure 21:
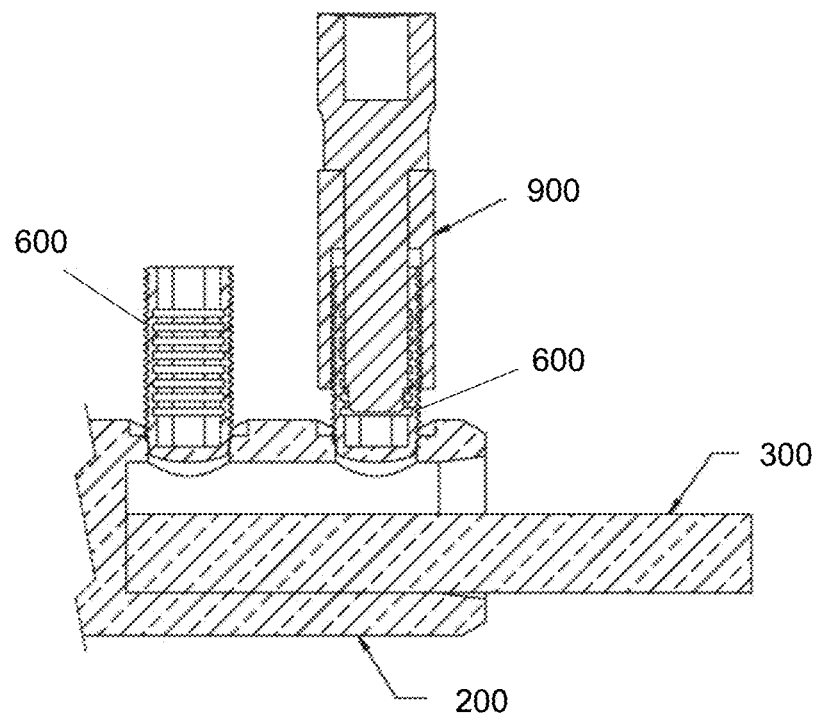
FIG. 21 is a sectional view, taken along line C-C of FIG. 20.
Figure 25:
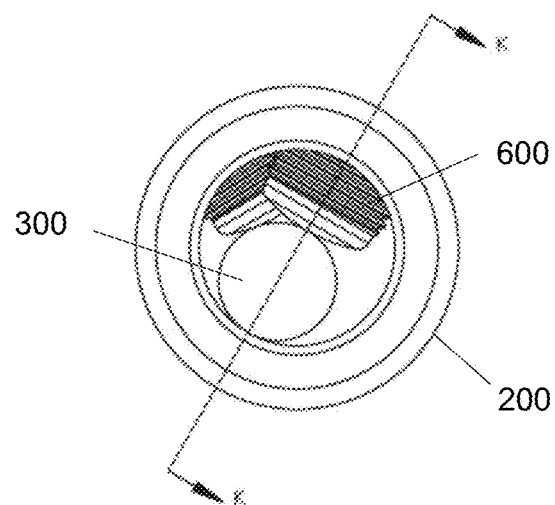
FIG. 25 shows the end view of FIG. 22 with the bolts tightened against the conductor, the bolt heads sheared off, and the bolt installation tool removed.
Figure 26:
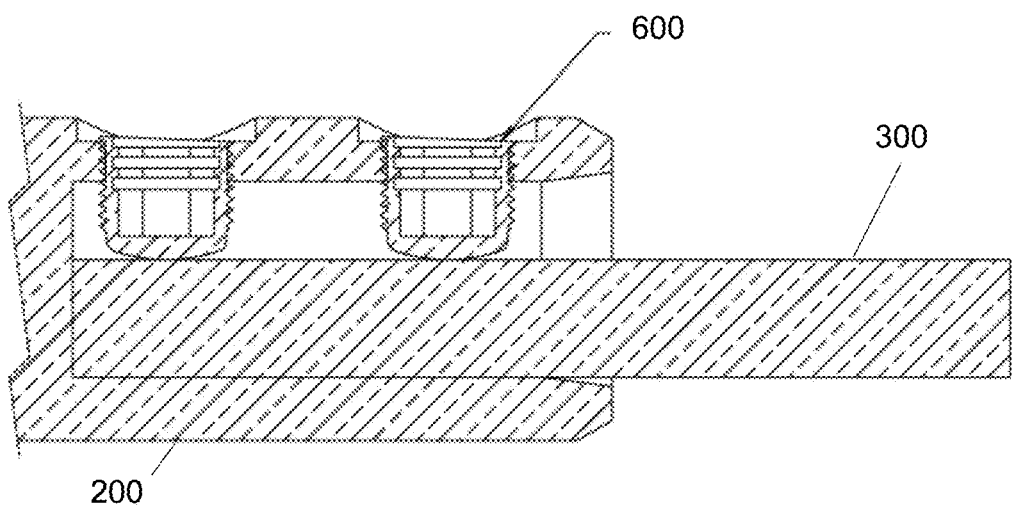
FIG. 26 is a sectional view, taken along line K-K of FIG. 25.
Figure 27:
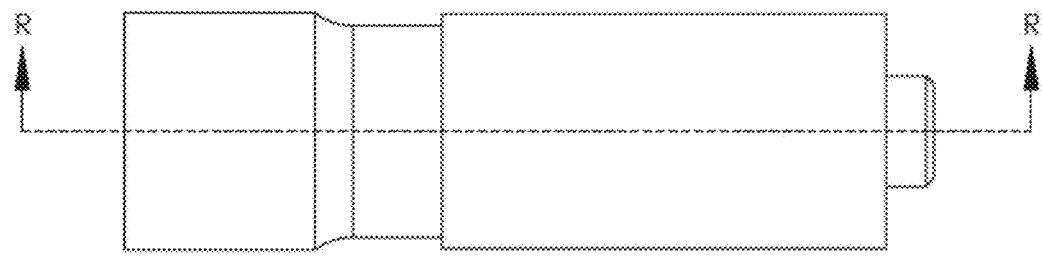
FIG. 27 is a side view of a bolt installation tool according to some embodiments of the disclosure.

FIG. 18 is an end view of a connector 200 with range taking shear bolts 600 according to embodiments of the present disclosure partially installed therein; FIG. 19 is a sectional view, taken along line B-B of FIG. 18. FIGS. 20 and 21 show range taking shear bolts 600 partially installed in connector 200 (as in FIGS. 18 and 19), with a cable conductor 300 and a bolt installation (drive) tool 900 also illustrated. FIG. 21 is a sectional view, taken along line C-C of FIG. 20. FIGS. 22 and 23 show range taking shear bolts 600 (as in the views of FIGS. 20 and 21) installed in connector 200 and tightened against conductor 300. FIG. 23 is a sectional view, taken along line D-D of FIG. 22. FIG. 24 is a view of detail L of FIG. 23 (scale 3:1). FIGS. 25 and 26 show range taking shear bolts 600 (as in the views of FIGS. 22 and 23) fully installed in connector 200, with the upper portion sheared off. FIG. 26 is a sectional view, taken along line K-K of FIG. 25.

Figure 28:
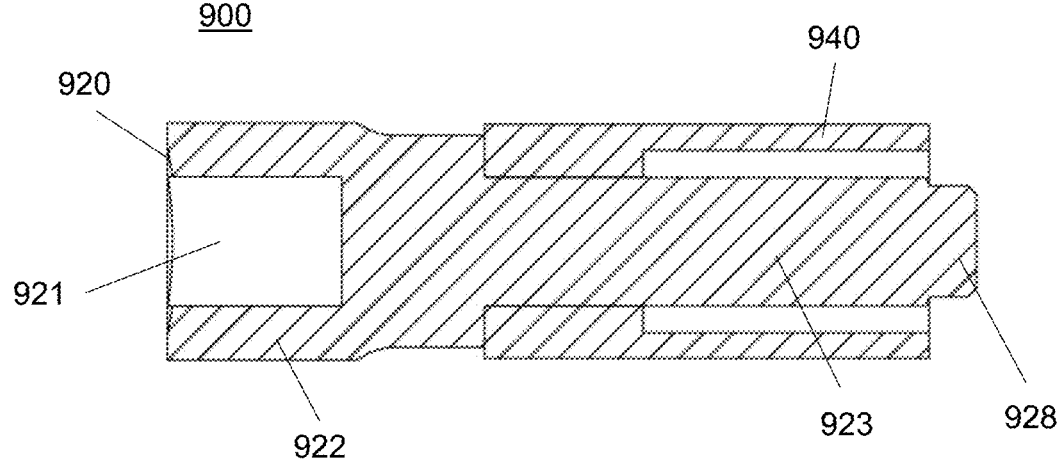
FIG. 28 is a sectional view, taken along line R-R of FIG. 27.
Figure 29:
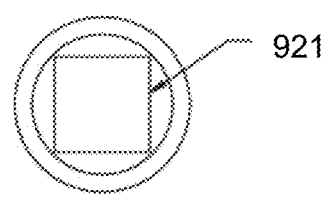
FIG. 29 is a top view of the tool of FIG. 27.
Figure 30:
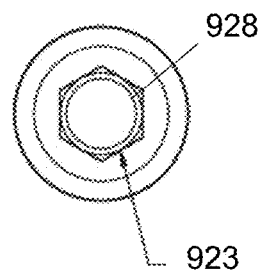
FIG. 30 is an end view of the tool of FIG. 27.
Figure 38:
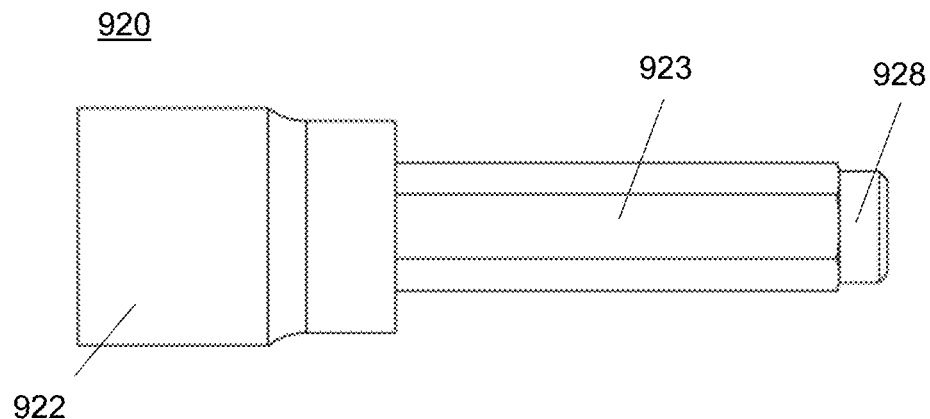
FIG. 38 is a side view of the inner portion of the bolt installation tool of FIG. 27.
Figure 39:
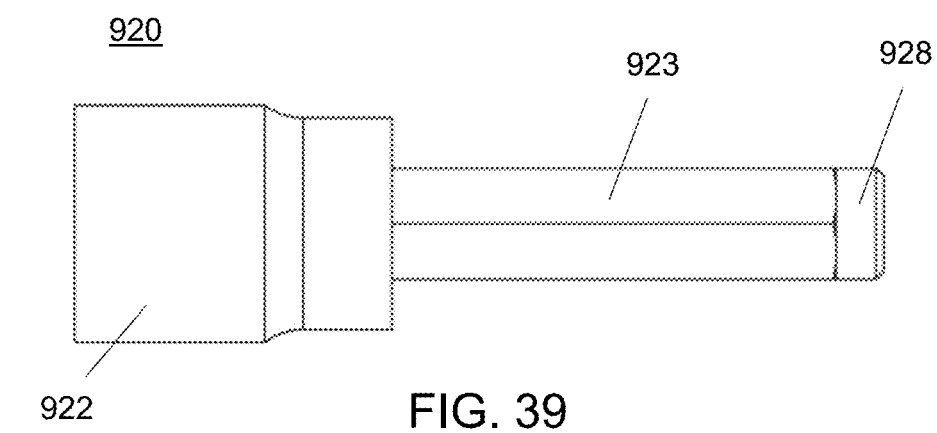
FIG. 39 is a side view of the inner portion of the bolt installation tool of FIG. 27.
Figure 40:
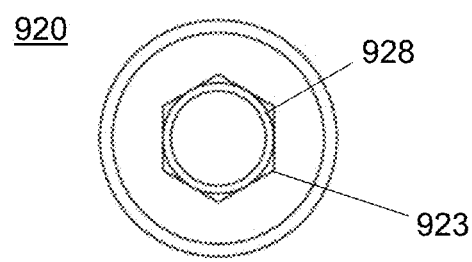
FIG. 40 is an end view of the inner portion of the bolt installation tool of FIG. 27.

FIGS. 27-30 and 38-40 show a drive tool 900 according to some embodiments, which is used to tighten the bolt 600 into the connector 200. FIG. 28 is a sectional view, taken along line R-R of FIG. 27, and shows drive tool 900 comprising an inner portion 920 and an outer portion 940. In some embodiments, the inner portion 920 and the outer portion 940 of the drive tool 900 are two separate pieces. In some embodiments, the inner portion 920 and the outer portion 940 of the drive tool 900 may be formed as one piece. FIGS. 29 and 30 show top and distal end views of the drive tool of FIG. 27, respectively. FIGS. 38-40 show two side views and a distal end view, respectively, of the inner portion 920 of the drive tool of FIG. 27.

Inner portion 920 includes a drive portion 923 having a non-round (e.g., hexagonal) shape complementary to that of the inner surface of bore 605, and a head portion 922 having a diameter larger than the drive portion 923. As shown in the top view of FIG. 29, in some embodiments, head portion 922 includes a standard square drive 921 to accept a socket or impact wrench. In other embodiments, head portion 922 may include, for example, a hexagonal drive 921. The drive portion 923 of the tool 900 is configured to engage with the non-round shape of the inner surface/bore 605 of the shear bolt 600 for the purpose of driving the screw/bolt 600. A distal end portion 928 of inner portion 920 (which may be inwardly tapered, e.g., as shown in FIGS. 24 and 28) can provide a short pilot diameter that is round. The round pilot section at distal end 928 is configured to interface with the non-round (hex or spline) bore 605 of the bolt 600 to ensure that the drive tool 900 stays centered with and rotates around the same axis as the bolt 600 during tightening and specifically during the shearing of the bolt. Without this feature, when the bolt breaks it can remain attached on one side and the drive tool/upper portion of the bolt rotate about the section that stays attached, taking the bolt 600 and drive tool 900 out of alignment about the same axis. This either results in a burr on the portion of the bolt 600 in the connector 200 or the upper portion of the bolt 600 not breaking completely from the rest of the bolt.

Drive portion 923 is surrounded by a tube/spacer (outer portion) 940 that supports the bolt 600 down to the surface where breakage is desired. Tubular spacer 940 is configured with an I.D. to accept the screw/bolt 600 and a length approximately the same as, or slightly shorter than, the non-round (e.g., hex) drive 923. During installation, the tubular spacer 940 is positioned against a counterbore 224 just below the outer diameter (O.D.) of the connector 200 (see FIG. 24), which can prevent the bolt 600 from shearing at a weak point above the surface of the connector 200. Since the hex drive 923 and tubular support 940 are approximately the same length, the spacer 940 ensures the hex drive 923 is always positioned at the appropriate location at the face of the counterbore 224.

Figure 31:
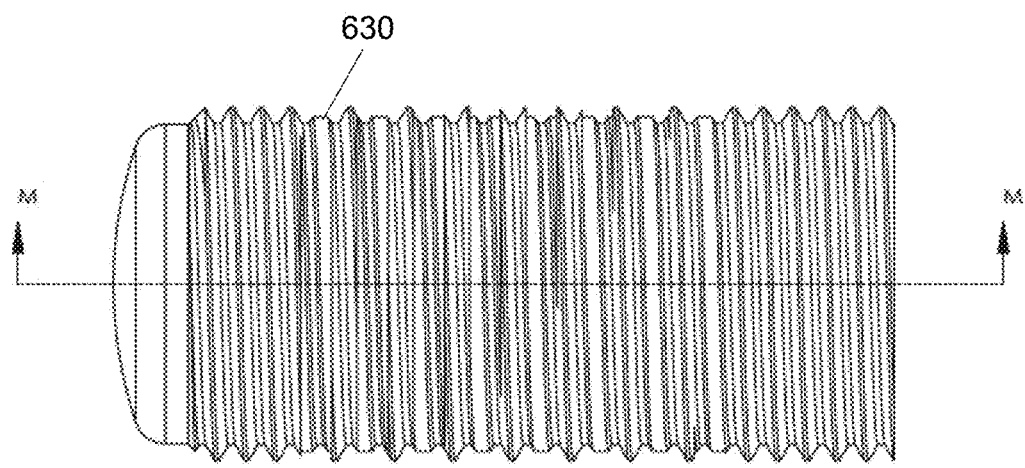
FIG. 31 is a side view of a range taking shear bolt according to some embodiments of the disclosure.
Figure 32:
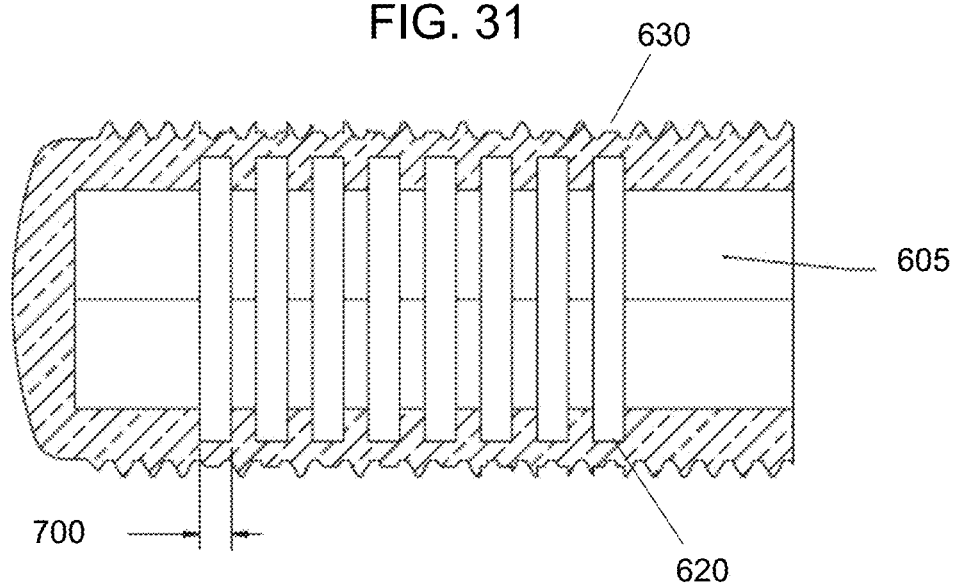
FIG. 32 is a sectional view, taken along line M-M of FIG. 31.
Figure 33:
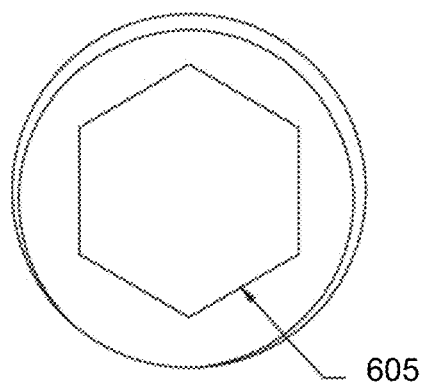
FIG. 33 is a top view of the range taking shear bolt of FIG. 31.

As shown in FIGS. 31-33, in some embodiments, instead of (or in addition to) longitudinal grooves 610, shear bolts 600 of the present disclosure may include O.D. grooves 630 in addition to I.D. grooves 620. Grooves 630 are substantially aligned with/positioned opposite to grooves 620 can further thin the wall of the shear bolt 600 at shear zones 700. FIG. 32 is a sectional view, taken along line M-M of FIG. 31, and FIG. 33 is an end view, showing a hexagonal bore 605. As shown, in some embodiments, grooves 630 may remove about half the thread height; however, in other embodiments, the dimensions of grooves 630 may vary so that they remove a different amount, or all, of the screw thread 604. In some embodiments, partial (not full) removal of the screw thread 604 may be preferred. In embodiments having O.D. grooves that completely remove the screw thread, since the thread is not fully supported (engaged) down the entire length of the bolt, as the bolt is tightened the threaded sections separated by a groove can become slightly misaligned due to the torsional flexing of the material. This slight misalignment can result in cross-threading of the screw and can cause the bolt to shear before the ideal clamping force is achieved.

Figure 34:
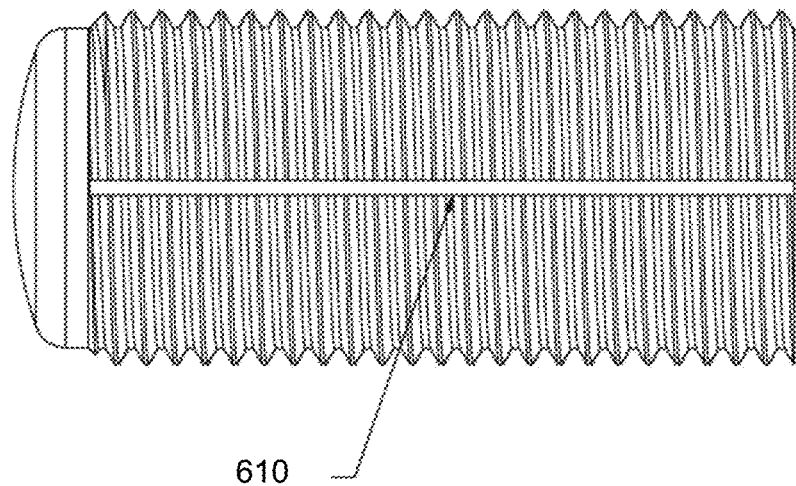
FIG. 34 is a side view of a range taking shear bolt according to some embodiments of the disclosure.
Figure 35:
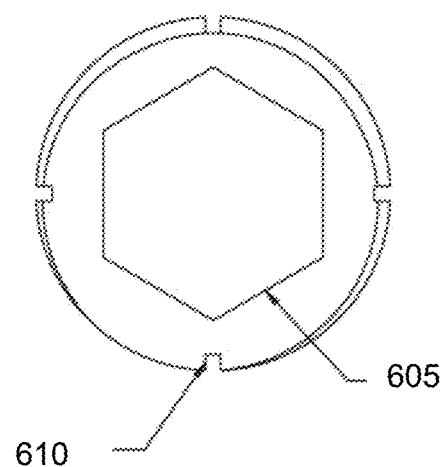
FIG. 35 is a top view of the range taking shear bolt of FIG. 34.
Figure 36:
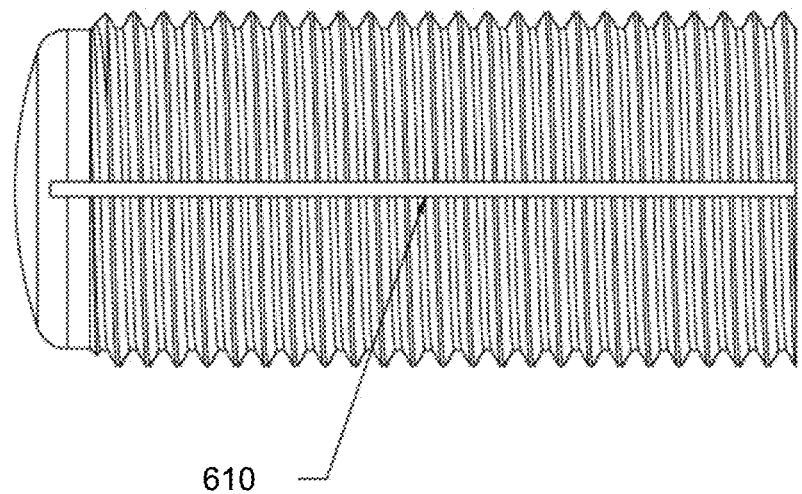
FIG. 36 is a side view of a range taking shear bolt according to some embodiments of the disclosure.
Figure 37:
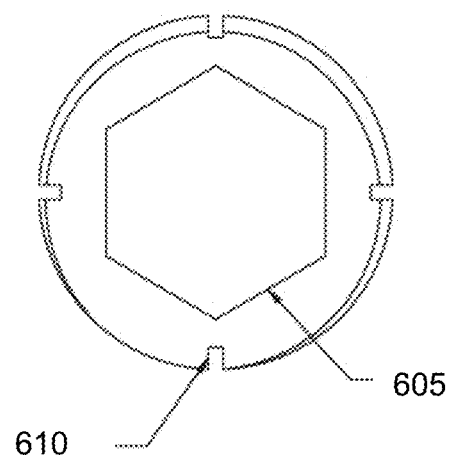
FIG. 37 is a top view of the range taking shear bolt of FIG. 36.

In some embodiments, as shown in the side and top views of FIGS. 34-35, longitudinal grooves 610 may be provided in the thread 604 down the length of the bolt 600. In some embodiments, as shown in side and top views of FIGS. 36-37, longitudinal grooves 610 may extend beyond the thread 604. The number of grooves 610 provided on bolt 600 may vary; four are illustrated herein as an example, but more or fewer longitudinal grooves 610 may be provided in other embodiments. In some embodiments, longitudinal grooves can be preferable to O.D. grooves because they do not increase thread friction (which can result in lower clamping force for a given installation torque).

Figure 41:
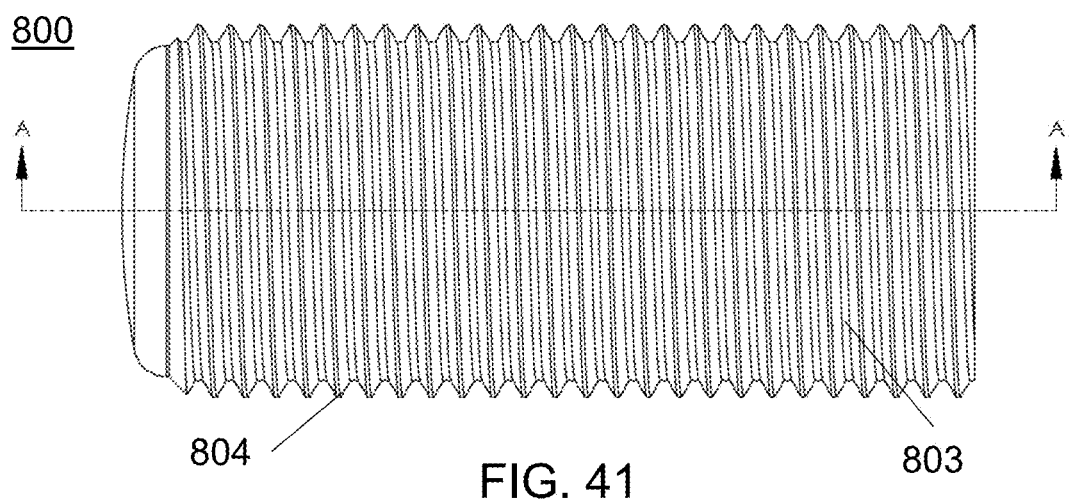
FIG. 41 is a side view showing a range taking shear bolt, according to certain aspects of the present disclosure.

Referring to FIG. 41, a side view of a range taking shear bolt 800 is shown, according to certain aspects of the present disclosure. The range taking shear bolt 800 is the same as, or similar to, the range taking shear bolt 600 as shown in FIGS. 15-26, where like reference numerals designate similar or equivalent elements, except that the range taking shear bolt 800 does not have the longitudinal grooves 610, and the internal grooves 820 (FIG. 42) are V-shaped. As shown in FIG. 41, the range taking shear bolt 800 includes an external screw thread 804 that is continuous on the outer surface 803 of the range taking shear bolt 800.

Figure 42:
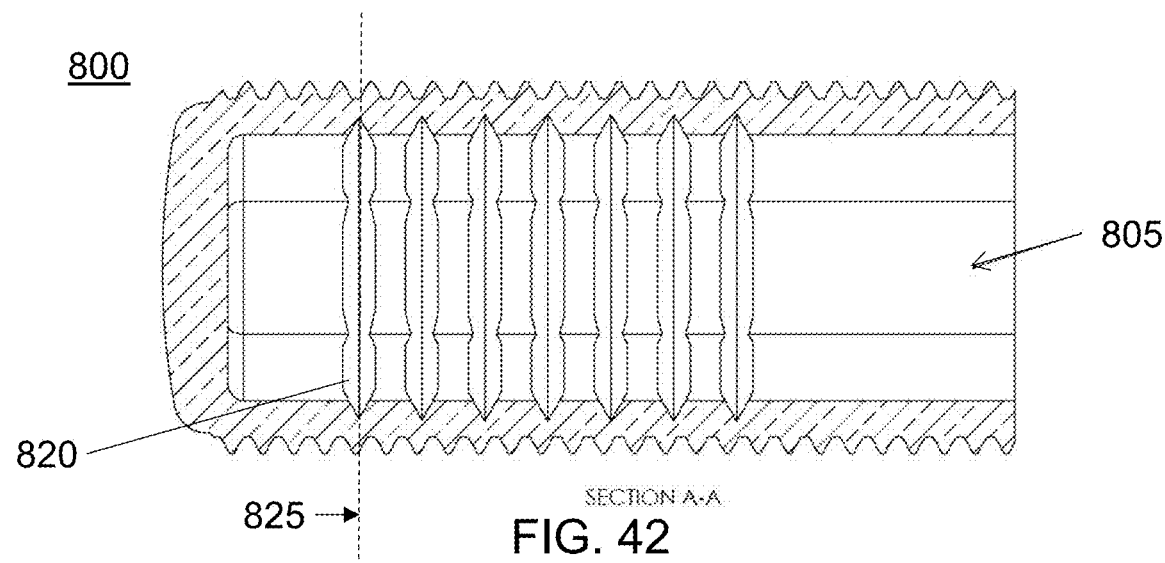
FIG. 42 is a sectional view, taken along line A-A of FIG. 41.

Referring to FIG. 42, a sectional view of the range taking shear bolt 800 is shown, taken along line A-A of FIG. 41. In some implementations, the range taking shear bolt 800 includes an inner surface (hollow bore) 805 with one or more internal grooves 820 spaced along the inner diameter and substantially perpendicular to the center axis of the range taking shear bolt 800. In this example, the internal grooves 820 are V-shaped. Each internal groove 820 creates a shear point (or ring) 825 along the length of the screw/bolt 800, by creating a reduced wall thickness in a tapered manner between the outside threaded surface and the inner diameter. These thinner wall sections provided by the internal grooves 820 serve as the shear points 825, where the bolt 800 will break when the appropriate tightening torque is achieved. Each tapered or V-shaped internal groove 820 provides a cleaner and more precise break with no burr or loose sections of material breaking off during shearing, because the wall thickness is the smallest at each corresponding shear point 825 (i.e., at the tip of the "V"). The number and exact positions of the internal grooves 820 may vary according to the specific application. The spacing between adjacent internal grooves 820 may be uniform or variable.

Figure 43:
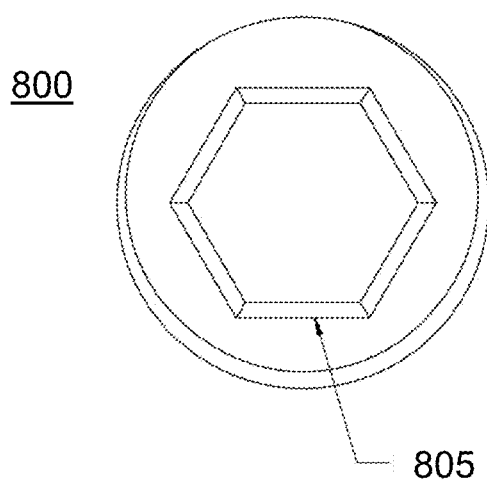
FIG. 43 is a top view of the range taking shear bolt of FIG. 41.

Similar to the range taking shear bolt 600, the bore 805 has a non-round shape. In an example, as shown in the top/proximal end view of FIG. 43, the bore 805 of the range taking shear bolt 800 is hexagonal in shape. The material used to form the bolt 800 may comprise a metal (such as, but not limited to, copper and zinc) or alloy (such as, but not limited to, brass or bronze). In some examples, the bolt 800 may be made from 314 commercial bronze. This type of bronze (alloy 314) has a high electrical conductivity as well as mechanical properties suitable for this application. Bronze can be a particularly suitable material for this application due to its strength and low elongation. It is also electrically conductive, and has natural corrosion protection. It can be readily tin plated for use on copper or aluminum cable for further corrosion protection.

Figure 44:
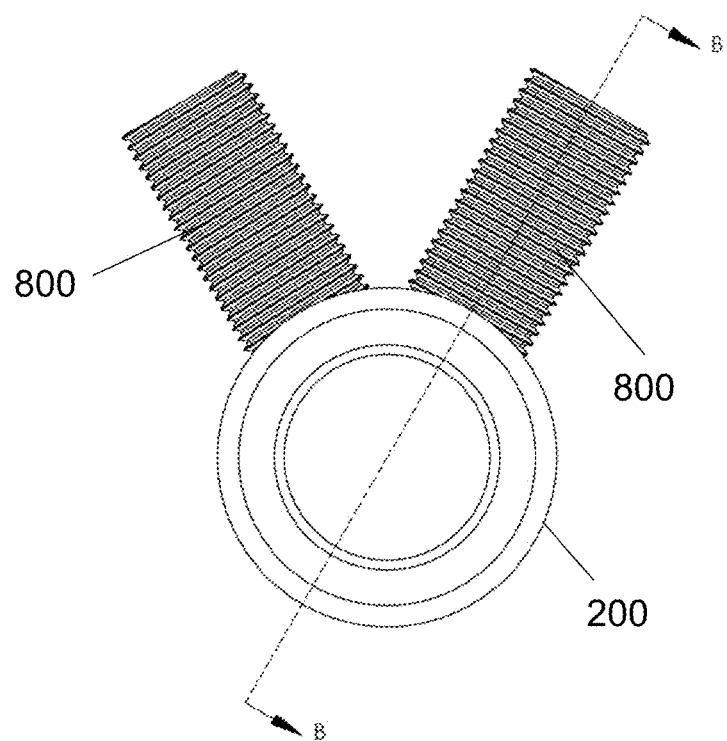
FIG. 44 is an end view of a connector with two range taking shear bolts of FIG. 41 partially installed therein, according to certain aspects of the present disclosure.
Figure 45:
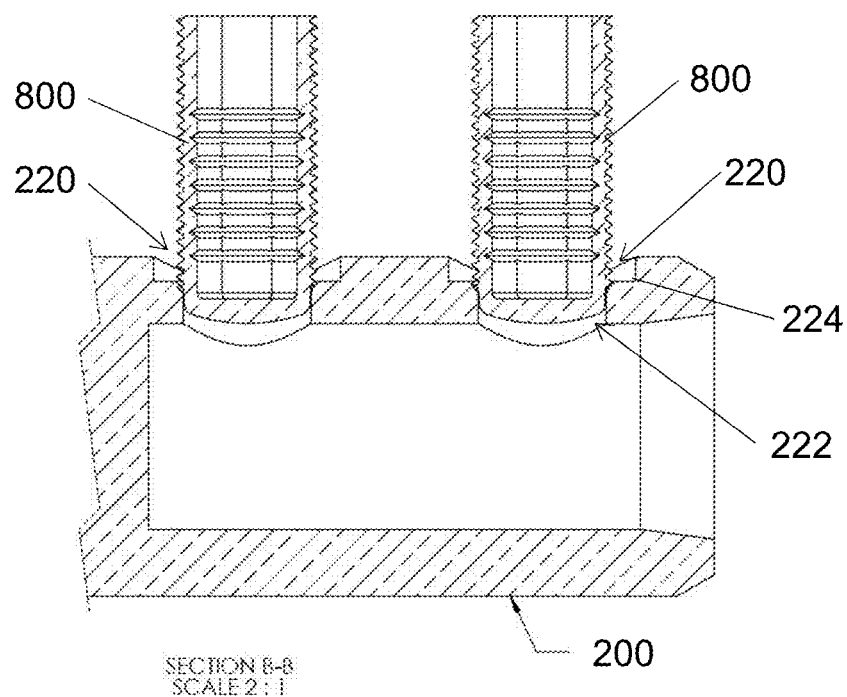
FIG. 45 is a sectional view, taken along line B-B of FIG. 44.
Figure 53:
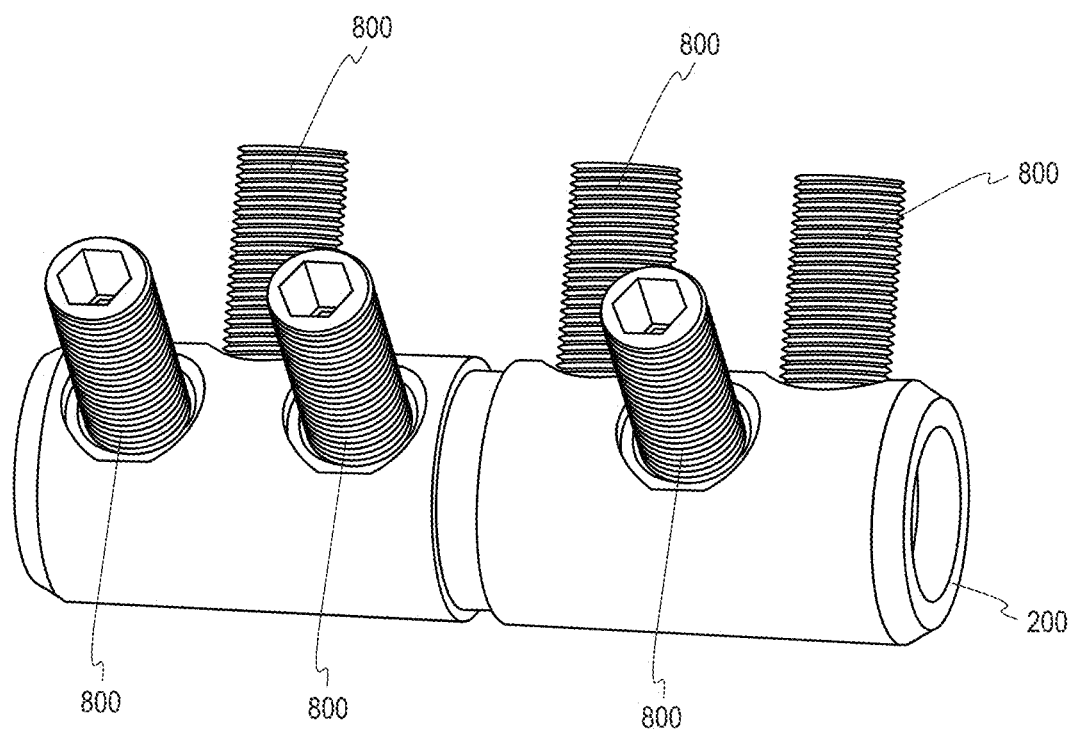
FIG. 53 is a side view of the connector of FIG. 44 with a plurality of range taking shear bolts partially installed therein.

Referring to FIG. 44, an end view of the connector 200 (as shown in the previous Figures) is illustrated, showing two adjacent range taking shear bolts 800 partially installed therein. FIG. 45 is a sectional view, taken along line B-B of FIG. 44, showing two in-line range taking shear bolts 800. A side view of the connector 200 of FIG. 44 is shown in FIG. 53, which illustrates a plurality of range taking shear bolts 800 partially installed therein. In this example connector design, there are three range taking shear bolts 800 used per cable connection. FIG. 53 shows two cable connections, thus six total range taking shear bolts 800. For each cable connection, two of the range taking shear bolts 800 are in-line with each other (as shown in the section view in FIG. 45), and the third range taking shear bolt 800 is offset at an angle (as shown in the end view in FIG. 44). The number and positioning of the range taking shear bolts 800 may vary based on the connector design and cable size.

As described herein with reference to FIGS. 4-5, the body of the connector 200 may be substantially tubular, configured to accept cable, and may be made of any suitable material—for example, a machined metal, typically copper or aluminum. A plurality of bolt installation sites 220 may be provided along the length of the connector 200. Each bolt installation site 220 is configured to accept a range taking shear bolt 800 substantially perpendicular to the axis of the cable, and may comprise a threaded opening 222. In some implementations, the outer diameter of the connector 200 includes a recessed portion (or a depression) 224 at each bolt installation site 220. Adjacent bolt installation sites 220 may be staggered by an angle, such as 15 degrees, 30 degrees, 45 degrees, 60 degrees, 75 degrees, 90 degrees, 105 degrees, 120 degrees, 135 degrees, 150 degrees, 165 degrees, 180 degrees, etc. In this example shown in FIG. 44, the two adjacent range taking shear bolts 800 are staggered by 60 degrees.

Figure 46:
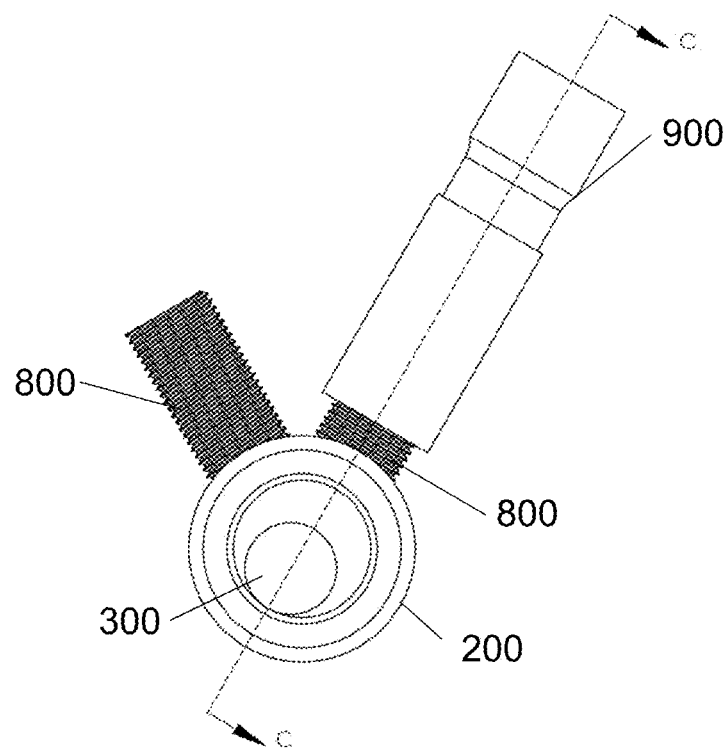
FIG. 46 shows the end view of FIG. 44 with a cable conductor and a bolt installation tool included, according to certain aspects of the present disclosure.
Figure 47:
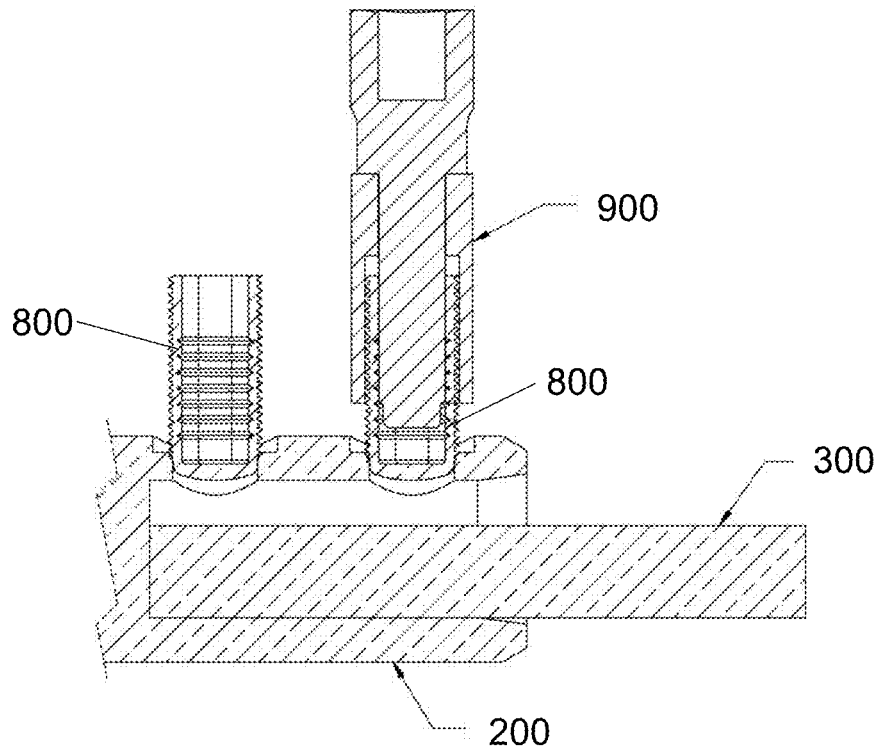
FIG. 47 is a sectional view, taken along line C-C of FIG. 46.

FIGS. 46 and 47 show two adjacent range taking shear bolts 800 partially installed in the connector 200 (similar to FIGS. 44 and 45), with a cable conductor 300 (as shown in the previous Figures) and a bolt installation (drive) tool 900 also illustrated. The bolt installation tool 900 is illustrated in and described with respect to FIGS. 27-30 and 38-40. Specifically, FIG. 47 is a sectional view, taken along line C-C of FIG. 46.

FIGS. 48 and 49 show two adjacent range taking shear bolts 800 (similar to the views of FIGS. 46 and 47) installed in the connector 200, with one of the bolts 800 tightened against the conductor 300. Specifically, FIG. 49 is a sectional view, taken along line D-D of FIG. 48. Further, FIG. 50 is a view of detail L of FIG. 49 (scale 3:1). In this example, the bolt installation tool 900 is used to tighten one of the range taking shear bolts 800 into the connector 200. The inner portion 920 of the drive tool 900 includes a drive portion 923 having a non-round shape complementary to that of the inner surface 805 of the range taking shear bolt 800. The drive portion 923 of the drive tool 900 is configured to engage with the non-round shape of the inner surface (bore) 805 of the range taking shear bolt 800, for the purpose of driving the bolt 800.

Referring to FIGS. 49-50, the round pilot section at the distal end 928 is configured to interface with the non-round (e.g., hexagonal) inner surface (bore) 805 of the bolt 800, to ensure that the drive tool 900 stays centered with and rotates around the same axis as the bolt 800 during tightening, and specifically during the shearing of the bolt 800. The drive portion 923 is surrounded by a tube/spacer (outer portion) 940 that supports the bolt 800, down to the surface where breakage is desired.

Figure 51:
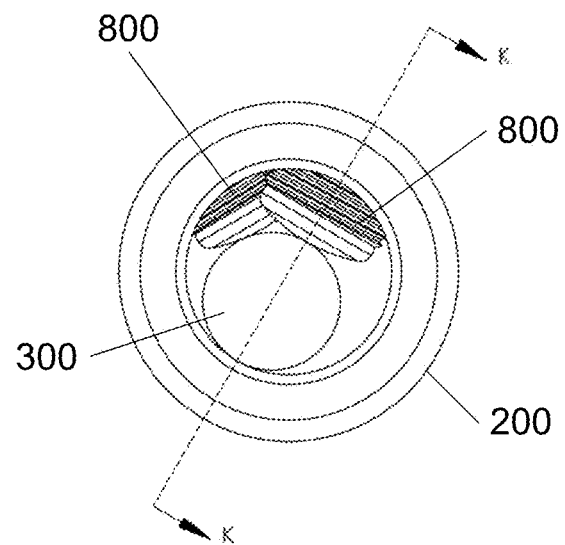
FIG. 51 shows the end view of FIG. 48 with the range taking shear bolts tightened against the conductor, the bolt heads sheared off, and the bolt installation tool removed, according to certain aspects of the present disclosure.
Figure 52:
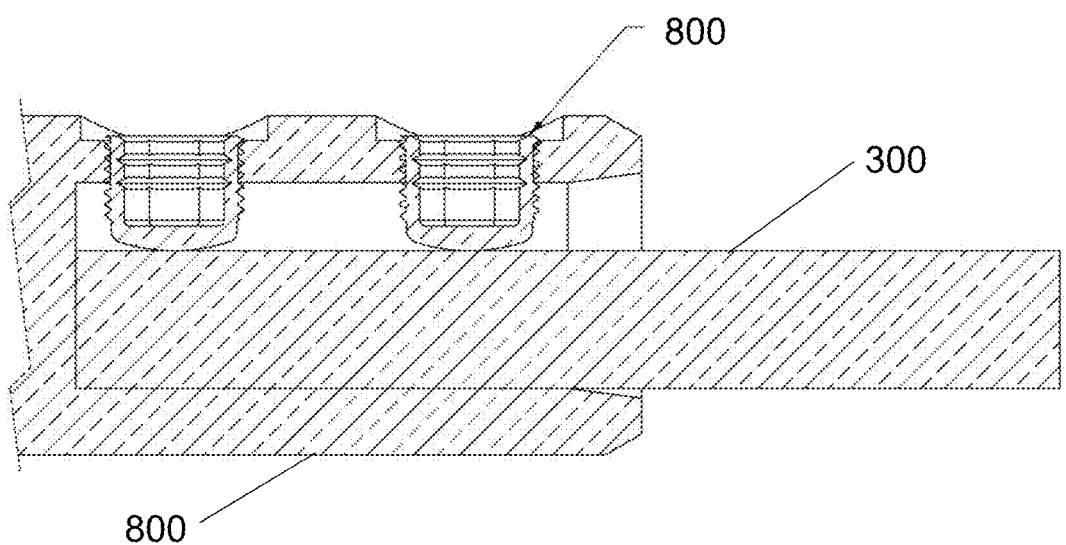
FIG. 52 is a sectional view, taken along line K-K of FIG. 51.

FIG. 51 shows the end view of FIG. 48 with the two range taking shear bolts 800 fully installed in the connector 200. As shown, the range taking shear bolts 800 are tightened against the conductor 300, with the bolt heads sheared off, and the bolt installation tool 900 removed (compared to FIG. 48). FIG. 52 is a sectional view, taken along line K-K of FIG. 51.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

The invention claimed is:

1. A range taking shear bolt system, comprising:
a range taking shear bolt; and
a drive tool for installing the range taking shear bolt in a range taking connector,
the range taking shear bolt comprising:
a hollow body comprising a wall having an outer surface and an inner surface; a
distal end constructed and arranged to abut a cable conductor; and a
proximal end constructed and arranged to accept the drive tool,
the inner surface having a non-round shape configured to engage with the drive tool and including one or more internal grooves substantially perpendicular to the longitudinal axis of the bolt, the one or more internal grooves defining one or more shear zones where the wall is configured to shear when an applied torque reaches or exceeds a predetermined torque value, and
the outer surface having a screw thread configured to engage with a threaded opening on the connector and including one or more longitudinal grooves in the thread along a longitudinal axis of the bolt and/or one or more external grooves substantially perpendicular to longitudinal axis of the bolt, each external groove aligned with a corresponding internal groove; and
the drive tool comprising:
an inner portion comprising a head portion and a drive portion; and an outer portion comprising a tubular body,
the head portion including a hexagonal drive or a square drive configured to accept a socket or impact wrench,
the drive portion having a non-round shape configured to fit inside the body of the range taking shear bolt and engage with the inner surface thereof, and
the tubular body configured to fit over the body of the range taking shear bolt and abut the connector to control a depth of tool insertion.

2. The system of claim 1, wherein the predetermined torque value is a function of a thickness of the wall.

3. The system of claim 1, wherein the range taking shear bolt is formed from a metal or alloy.

4. The system of claim 3, wherein the range taking shear bolt is formed from bronze.

5. The system of claim 1, wherein the inner surface of the range taking shear bolt has a hexagonal shape.

6. The system of claim 1, wherein the drive portion of the drive tool has a hexagonal shape.

7. A range taking shear bolt system comprising:
a range taking shear bolt; and
a drive tool for installing the range taking shear bolt in a range taking connector,
wherein the range taking shear bolt comprises:
a hollow body defined by a wall having an outer surface and an inner surface,
the inner surface having a non-round shape configured to engage with the drive tool and including a plurality of V-shaped internal grooves substantially perpendicular to a longitudinal axis of the range taking shear bolt, the plurality of V-shaped internal grooves being dispersed along a length of the hollow body and a tip of each of the plurality of V-shaped internal grooves defining a potential shear point where the wall is configured to shear when an applied torque reaches or exceeds a predetermined torque value, the outer surface having a continuous screw thread configured to engage with a threaded opening on the range taking connector;

a distal end configured to abut a cable conductor inside the range taking connector; and a proximal end configured to accept the drive tool; and the drive tool comprising:

an inner portion having a head portion, a distal end portion, and a drive portion, the drive portion having a non-round shape configured to be accepted by the proximal end of the range taking shear bolt and engage with the inner surface of the hollow body, the distal end portion being located below the drive portion, the distal end portion having a diameter that is less than a diameter of the drive portion and configured to be a pilot for entry into the hollow body of the range taking shear bolt; and an outer portion having a tubular body, the tubular body configured to fit over the hollow body of the range taking shear bolt and abut the range taking connector to control a depth of insertion of the drive tool, wherein, in response to the applied torque from the drive tool reaching or exceeding the predetermined torque value, the hollow body of the range taking shear bolt shears at one of the plurality of V-shaped internal grooves, the one of the plurality of V-shaped internal grooves at which the shearing takes place is independent of a depth of insertion of the inner portion of the drive tool within the hollow body of the range taking shear bolt.

8. The range taking shear bolt system of claim 7, wherein the head portion of the drive tool includes a hexagonal drive or a square drive configured to accept a socket or impact wrench.

9. The range taking shear bolt system of claim 7, wherein the drive portion of the drive tool has a hexagonal shape.

10. The range taking shear bolt system of claim 7, wherein the predetermined torque value is dictated by a thickness of the wall.

11. The range taking shear bolt system of claim 7, wherein the range taking shear bolt is formed from a metal or alloy.

12. The range taking shear bolt system of claim 11, wherein the range taking shear bolt is formed from bronze.

13. The range taking shear bolt system of claim 7, wherein the inner surface of the range taking shear bolt has a hexagonal shape.

14. The range taking shear bolt system of claim 13, wherein the inner surface having the hexagonal shape extends into the proximal end.

15. The range taking shear bolt system of claim 7, wherein the distal end of the range taking shear bolt includes a substantially blunt surface for engage a surface of the cable conductor.

16. The range taking shear bolt system of claim 7, wherein the continuous screw thread of the outer surface of the range taking shear bolt is formed to have at least two full turns of the thread located between adjacent ones of the plurality of V-shaped internal grooves.

17. A range taking shear bolt system comprising:
a range taking shear bolt; and
a drive tool for installing the range taking shear bolt in a range taking connector,
the range taking shear bolt comprising:

a distal end configured to abut a cable conductor inside a range taking connector,
a proximal end configured to accept the drive tool; and
a hollow body defined by a wall having an outer surface and an inner surface, the inner surface having a non-round shape configured to engage with the drive tool and including a plurality of V-shaped internal grooves substantially perpendicular to a longitudinal axis of the range taking shear bolt, the plurality of V-shaped internal grooves being dispersed along a length of the hollow body and a tip of each of the plurality of V-shaped internal grooves defining a potential shear point where the wall is configured to shear when an applied torque from the drive tool reaches or exceeds a predetermined torque value, the outer surface having a continuous screw thread configured to engage with a threaded opening on the range taking connector, the outer surface extending between the distal end and the proximal end, the continuous screw thread being uninterrupted between the distal end and the proximal end; and the drive tool comprising:

an inner portion having a head portion, a distal end portion, and a drive portion, the drive portion having a non-round shape configured to be accepted by the proximal end of the range taking shear bolt and engage with the inner surface of the hollow body, the distal end portion being located below the drive portion, the distal end portion having a diameter that is less than a diameter of the drive portion and configured to be a pilot for entry into the hollow body of the range taking shear bolt; and an outer portion comprising a tubular body, the tubular body configured to fit over the hollow body of the range taking shear bolt and abut the range taking connector to control a depth of insertion of the drive tool, wherein, in response to the applied torque from the drive tool reaching or exceeding the predetermined torque value, the hollow body of the range taking shear bolt shears at one of the plurality of V-shaped internal grooves, the one of the plurality of internal grooves at which the shearing takes place is independent of a depth of insertion of the inner portion of the drive tool within the hollow body of the range taking shear bolt.

18. The range taking shear bolt system of claim 17, wherein the non-round shape of the internal surface of the range taking shear bolt is polygonal.

19. The range taking shear bolt system of claim 18, wherein the non-round shape of the internal surface of the range taking shear bolt is hexagonal.

20. The range taking shear bolt system of claim 17, wherein the tip of each of the plurality of V-shaped internal grooves defines a smallest thickness of the wall of the hollow body.

21. The range taking shear bolt system of claim 20, wherein the plurality of V-shaped internal grooves is evenly spaced.

22. The range taking shear bolt system of claim 17, wherein the distal end of the range taking shear bolt includes a substantially blunt surface for engage a surface of the cable conductor.

23. The range taking shear bolt system of claim 17, wherein the continuous screw thread of the outer surface of the range taking shear bolt is formed to have at least two full turns of the thread located between adjacent ones of the plurality of internal grooves.

* * * * *